(12) United States Patent
Arima et al.

(10) Patent No.: US 7,004,201 B2
(45) Date of Patent: Feb. 28, 2006

(54) VIBRATION ABSORBING HOSE

(75) Inventors: Tetsuya Arima, Aichi-ken (JP);
Norihiko Furuta, Aichi-ken (JP);
Ayumu Ikemoto, Aichi-ken (JP)

(73) Assignee: Tokai Rubber Industries, Ltd., (JP)

( * ) Notice: Subject to any disclaimer, the term of this patent is extended or adjusted under 35 U.S.C. 154(b) by 0 days.

(21) Appl. No.: 10/862,528

(22) Filed: Jun. 7, 2004

(65) Prior Publication Data

US 2004/0256016 A1 Dec. 23, 2004

(30) Foreign Application Priority Data

| Jun. 23, 2003 | (JP) | ............................. 2003-178062 |
| Jun. 23, 2003 | (JP) | ............................. 2003-178064 |
| Jun. 23, 2003 | (JP) | ............................. 2003-178065 |
| Jun. 23, 2003 | (JP) | ............................. 2003-178066 |
| Jun. 23, 2003 | (JP) | ............................. 2003-178067 |
| Mar. 29, 2004 | (JP) | ............................. 2004-097079 |
| Mar. 29, 2004 | (JP) | ............................. 2004-097085 |
| May 21, 2004 | (JP) | ............................. 2004-152109 |

(51) Int. Cl.
*F16L 11/04* (2006.01)

(52) U.S. Cl. .................. 138/121; 138/122; 138/173; 138/126; 138/124

(58) Field of Classification Search ............... 138/121, 138/122, 173, 123–127
See application file for complete search history.

(56) References Cited

U.S. PATENT DOCUMENTS

| 3,279,502 | A | 10/1966 | Waddell, Jr. | ................. 138/122 |
| 3,626,988 | A | 12/1971 | Chu | ........................... 138/121 |
| 5,485,870 | A | 1/1996 | Kraik | ......................... 138/122 |
| 6,279,615 | B1 | 8/2001 | Iio et al. | ..................... 138/137 |

*Primary Examiner*—Patrick Brinson
(74) *Attorney, Agent, or Firm*—Andrus, Sceales, Starke & Sawall, LLP

(57) ABSTRACT

A vibration absorbing hose has a corrugated portion extending substantially entire part of the hose and end portions of straight cylindrical shape. The vibration absorbing hose has multi-layered construction of tubular inner rubber layer, pressure resistant reinforcement layer circumscribing an outer side of the inner rubber layer and outer rubber layer as outermost cover layer. The pressure resistant reinforcement layer is formed, for example, by braiding reinforcing yarns, so as to have corrugations along the corrugated portion of the inner rubber layer.

13 Claims, 32 Drawing Sheets

VIBRATION ABSORBING HOSE

BACKGROUND OF THE INVENTION

The present invention relates to a vibration absorbing hose, more specifically to a vibration absorbing hose which is excellent in pressure resistance and suitable for plumbing in an engine room for a motor vehicle.

In the past, a tubular rubber hose mainly composed of rubber elastic material has been widely used in a variety of plumbing or piping means for industrial and automotive applications. As such rubber hose has excellent vibration absorbing property, it is often arranged in vibration regions for the purpose of restraining vibration transmission.

For example, in case of plumbing hose such as hose for fuel system or refrigerant conveying hose (air conditioner hose) used in an engine room of a motor vehicle, the plumbing hose serves as to absorb engine vibration, compressor vibration of an air conditioner and other various vibration generated during car driving, and to restrain transmission of the vibration from one member to the other member which are joined via the plumbing hose.

Meanwhile, regardless of industrial or automotive applications, hoses for oil system, fuel system, water system and refrigerant system are formed in multi-layered construction including inner rubber layer, outer rubber layer and reinforcement layer interposed between the inner and outer rubber layers, for example, as disclosed in the Patent Document 1 below. The reinforcement layer is typically constructed by arranging or braiding reinforcing yarns.

FIG. 30 shows construction of a refrigerant conveying hose (air conditioner hose) which is disclosed in the Patent Document 1. The refrigerant conveying hose has multi-layered construction. Reference numeral 200 in FIG. 30 indicates tubular inner rubber layer. Resin inner layer 202 is formed or laminated in an inner side of the inner rubber layer 200. And, first reinforcement layer 204 is formed or laminated on an outer side of the inner rubber layer 200, and second reinforcement layer 206 is formed or laminated on an outer side of the first reinforcement layer 204 with intervening intermediate rubber layer 208 between the first and the second reinforcement layers 204, 206. The first reinforcement layer 204 is formed by winding reinforcing yarn or yarns spirally while the second reinforcement layer 206 is formed by winding reinforcing yarn or yarns spirally in the reverse direction to the winding direction of the first reinforcement layer 204. Further, outer rubber layer 210 is formed or laminated on outer side of the second reinforcement layer 206 as outermost layer which serves as cover layer.

In this example, the reinforcement layers 204, 206 are formed by arranging or winding reinforcing yarns spirally. On the other hand, such reinforcement layer is also likewise formed by braiding or braid-weaving reinforcing yarns. FIG. 31 shows an example of a hose having such braided reinforcement layer. Reference numeral 212 in FIG. 31 indicates reinforcement layer which is formed by braiding reinforcing yarns between the inner rubber layer 200 and the outer rubber layer 210. In this example, resin inner layer 202 is also formed in an inner side of the inner rubber layer 200.

As noted from these examples, all of conventional hoses which have been provided including reinforcement layer therein are shaped straight-sided or straight-walled tube having inner and outer side surfaces which are straight in a longitudinal direction. Meanwhile, in case of such straight-sided tubular hose, the hose needs to be designed to have a length according to rigidity of the hose in order to ensure favorable vibration absorbing property.

In particular, compared to low-pressure hoses for fuel system, water system or the like, a longer length is required for high pressure hoses such as those for oil system (for example, power steering system) or refrigerant system (refrigerant conveying system) to ensure sufficient vibration absorbing property and reduce transmission of noise and vibration to vehicle interior, with corresponding increases in rigidity of the hoses. For example, in case of refrigerant conveying hose, typically the hose of 300 mm to 600 mm in length is adapted to secure vibration absorbing property and reduce transmission of noise and vibration, even for plumbing or piping for direct distance of 200 mm.

However, an engine room is crammed with variety of components and parts. And, specifically in these days, due to necessity to ensure a compartment space as large as possible, an engine room has been designed in compact size and space or clearance in the engine room has been more and more narrowed. Therefore, under the circumstances, if a long hose is arranged in the engine room, it bothers an design engineer to design plumbing arrangement to avoid interference with other components or parts and an operator to handle the hose when arranging the hose in the engine room. Further, such plumbing design and handling of the hose according to types of a motor vehicle should be devised. These result in excessive work load in mounting and assembling vehicle parts and components.

In view of foregoing aspects, it is demanded to develop a rubber hose (rubber-elastic-material hose) of which properties such as vibration absorbing property are improved. One of the means to design the hose in short length without loosing favorable vibration absorbing property is to form the hose with corrugations. Actually, the following Patent Document 2 discloses a fuel hose (a hose for fuel system) of motor vehicle which is provided with corrugations.

FIG. 32 is a view to explain the fuel hose disclosed in the Patent Document 2. In FIG. 32 reference numeral 214 indicates tubular rubber layer, and reference numeral 216 indicates resin inner layer which is formed in the inner surface of the rubber layer 214. As shown in FIG. 32, the fuel hose is provided with corrugated portion 218. Therefore, in this fuel hose, it is possible to effectively absorb generated vibration thanks to flexibility of the corrugated portion 218 in spite of short length of the fuel hose.

Meanwhile, just by providing the hose with corrugated portion 218 as shown in FIG. 32, flexibility can be obtained, but sufficient pressure resistance cannot be ensured. That is, the hose of the disclosure is called a filler hose, and is adapted to a fuel filler opening. Therefore, pressure resistance is not specifically required for the hose of the disclosure. The construction of the hose shown in FIG. 32, wherein bursting pressure is under 1 MPa, may be adapted to a low-pressure hose such as filler hose, but may not be adapted without modification to a hose for which high-pressure resistance is required.

One of means to provide a hose including such corrugated portion or corrugations with pressure resistance may be to form on the hose a reinforcement layer which has a considerable reinforcing effect. The reinforcement layer should not diminish flexibility which the corrugations inherently has, and should be easily and favorably formed on outer surface side of the rubber layer.

Patent Document 1 JP, A, 7-68659
Patent Document 2 U.S. Pat. No. 6,279,615

Under the circumstances described above, it is an object of the present invention to provide a novel vibration absorbing hose which has excellent pressure resistance and does not loose sufficient vibration absorbing property if formed short in length.

SUMMARY OF THE INVENTION

According to the present invention, provided is a vibration absorbing hose comprises tubular rubber layer (rubber-elastic material layer) having corrugations (for example, a corrugated portion), pressure resistant reinforcement layer laminated on an outer surface side of the rubber layer. The pressure resistant reinforcement layer is formed shaped corresponding to the corrugations, for example, including reinforcing yarn or yarns provided, for example, interlaced, woven, wound or spiraled along the corrugations. Here, for example, the pressure resistant reinforcement layer is gradually laminated on the corrugations with providing the reinforcing yarn or yarns along the corrugations. May be applied such pressure resistant reinforcement layer as including reinforcing yarn or yarns knitted along the corrugations or wound spirally along the corrugations to form layer of shape corresponding to the corrugations. However, it is preferred to employ the pressure resistant reinforcement layer including the reinforcing yarns braided along the corrugations to form layer of shape corresponding to the corrugations. In other words, may be applied the means to form the pressure resistant reinforcement layer by braiding the reinforcing yarns along the corrugations. Further, it is effective to laminate a covering layer on an outer surface side of the pressure resistant reinforcement layer. Here, the covering layer may preferably be formed from a rubber-made layer or an outer rubber-made layer (rubber-elastic-material-made layer or outer rubber-elastic-material-made layer).

According to the present invention, the corrugations ensure favorable flexibility of the vibration absorbing hose. So, if the hose is formed short in length, favorable vibration absorbing property is achieved. That is, the present invention allows required hose length relatively short or short while ensuring favorable vibration absorbing property to the hose. This makes it possible to solve outstanding problems associated with plumbing hose specifically arranged in an engine room of motor vehicle for which pressure resistance is required, such as plumbing design or handling of the hose during mounting work. Further, by making a required hose length short, there may be obtained another benefit of high degree of design freedom.

In the present invention, for example, as the pressure resistant reinforcement layer includes reinforcing yarn or yarns provided along the corrugations to form layer shaped corresponding to the corrugations, the vibration absorbing hose may be provided with favorable or uniform pressure resistance. The present invention may ensure both excellent vibration absorbing property and pressure resistance to the hose.

According to the present invention, the pressure resistant reinforcement layer is laminated by providing the reinforcing yarn or yarns along the corrugations to form layer shaped corresponding to the corrugations. So, for example, corrugation hills and valleys are easily reinforced uniformly. Or, for example, the entire corrugations are easily reinforced uniformly. And, at the same time, there is no problem that the pressure resistant reinforcement layer considerably disturbs flexibility originated from the corrugations. Further, in one of aspects of the present invention, the pressure resistant reinforcement layer may be easily constructed in production of a vibration absorbing hose, and consequently production cost of the hose may be lowered.

It is desired to provide, for example, braid the reinforcing yarn or yarns at a providing angle (an angle at which the reinforcing yarn or yarns are provided, for example, with respect to the longitudinal direction), for example, a braiding angle, generally equal in corrugation hills and valleys or between the corrugation hills and valleys, for example, during braiding by controlling pulling speed of the reinforcing yarns at braiding machine. If a providing angle, for example, a braiding angle is larger than a neutral angle (54.44°), the vibration absorbing hose tends to be elongated in a longitudinal direction of the hose when internal pressure is exerted thereto. On the contrary, if the providing angle, for example, the braiding angle is smaller than the neutral angle, the vibration absorbing hose tends to expand in a radial direction. That is, the vibration absorbing hose behaves according to the providing angle, for example, the braiding angle when internal pressure is exerted thereto. So, unless the providing angle, for example, the braiding angle is equal in the corrugation hills and valleys, or between the corrugation hills and valleys, as the vibration absorbing hose behaves differently in corrugation hills and valleys during subject to the operation, it is afraid that pressure resistance is decreased.

The pressure resistant reinforcement layer formed by winding the reinforcing yarns spirally may be constructed from first reinforcing layer formed by winding reinforcing yarn or yarns in one direction and second reinforcing layer formed by winding reinforcing yarn or yarns in the reverse direction to the winding direction of the first reinforcing layer. The pressure resistant reinforcement layer may be formed by knitting the reinforcing yarn or yarns in either circumferential or longitudinal direction, or by knitting so that knitted loops continue in either longitudinal or circumferential direction. The pressure resistant reinforcement layer knitted in either direction is excellent in stretchability, and therefore has a feature of not decreasing flexibility of the vibration absorbing hose having corrugations.

Generally speaking, bursting resistant property of the hose is ensured by the pressure resistant reinforcement layer which is laminated. However, if the pressure resistant reinforcement layer have a coarse mesh or open spaces between yarns such that the inner rubber layer or the rubber layer is seen therethrough, when internal pressure is exerted to the vibration absorbing hose, the rubber layer is swollen and deformed so as to fill in the coarse mesh or the open spaces. As a result, it is feared that pinholes are caused or produced in the rubber layer. Such occurrence of pinholes resultantly lead to burst the vibration absorbing hose. Therefore, the pressure resistant reinforcement layer is formed by providing the reinforcing yarn or yarns closely and intimately. So, a twisted number of the reinforcing yarn is decreased, a number of yarn is increased, or thickness (diameter) of reinforcing yarn is increased to construct the pressure resistant reinforcement layer such that the rubber layer is not seen therethrough. That means, the pressure resistant reinforcement layer is preferably formed with fine or crushed mesh or without open spaces between yarns not to allow the (inner) rubber layer is deformed so as to fill therein.

By the way, while the pressure resistant reinforcement layer is formed along the corrugations, namely so as to follow the corrugations of the rubber layer to ensure pressure resistance, the pressure resistant reinforcement layer does not have sufficient function to restrain adjacent corrugation hills and adjacent corrugation valleys from widening. So, if internal pressure is exerted to the vibration absorbing hose, the corrugations might be elongated and the vibration absorbing hose might be largely elongated and deformed.

And, if the vibration absorbing hose is largely elongated and deformed, there is a fear that the hose contacts with peripheral parts and components or the like in piping path and it could happen that the vibration absorbing hose is damaged and its durability is lowered. It is also possible to adjust rigidity and wall-thickness of the rubber layer in order to deal with longitudinal change or elongation of the vibration absorbing hose. However, considering the balance with flexibility in order not to disturb vibration absorbing property of the hose, it is preferred to provide another separate reinforcement layer besides the pressure resistant reinforcement layer so as to prevent the hose from being elongated in the longitudinal direction thereof. So, it is effective to laminate another separate reinforcement layer on an outer surface side of the pressure resistant reinforcement layer with clearance defined at positions of the corrugation valleys of the corrugations between the pressure resistant reinforcement layer and the another separate reinforcement layer. For example, the another separate reinforcement layer has different construction and reinforcing property from the pressure resistant reinforcement layer. Such construction effectively prevents the vibration absorbing hose from being largely elongated in the longitudinal direction thereof resulting in abutment or contact with the peripheral parts and components or the like when internal pressure is exerted thereto. It is also effective to laminate a covering layer on an outer surface side of the another separate reinforcement layer. Here, preferably the covering layer may be formed from outer rubber-made layer.

The another separate reinforcement layer may be formed by providing, for example, interlaced, woven, wound or spiraled the reinforcing yarn or yarns. It is effective to provide, for example, braid reinforcing yarn or yarns at such a fixed angle (an angle at which the reinforcing yarn or yarns are provided, for example, with respect to the longitudinal direction), for example, a braiding angle as hardly allow a hose to be elongated in the longitudinal direction in order to restrain the vibration absorbing hose from being displaced in the longitudinal direction thereof. Therefore, in the another separate reinforcement layer, the fixed angle, for example, the braiding angle suitable for providing the reinforcing yarn or yarns is a neutral angle or lower, more specifically between 30° and 54.44° (a neutral angle).

Or, in order to restrain elongation of the vibration absorbing hose in the longitudinal direction thereof, the pressure resistant reinforcement layer may be formed so as to include a longitudinally oriented reinforcement yarn or yarns which run in a longitudinal direction of the vibration absorbing hose. The longitudinally oriented reinforcement yarn or yarns, may be interlaced with the reinforcing yarn or yarns when providing, for example, braiding the reinforcing yarn or yarns to form the pressure resistant reinforcement layer. In this construction, the longitudinally oriented reinforcement yarn or yarns and the reinforcing yarn or yarns are restrained each other and this allows the pressure resistant reinforcement layer to effectively limit elongation and deformation of the corrugations.

The corrugations (corrugated portion) may be formed in spirally corrugated pattern where corrugation hills and valleys respectively are continuous in a longitudinal direction of the vibration absorbing hose, and also in annularly corrugated pattern where longitudinally adjacent corrugation hills and longitudinally adjacent corrugation valleys are discontinuous and independent each other. The vibration absorbing hose with annularly corrugated pattern may further comprise a plurality of rigid annular arresting rings which are individually arranged along a longitudinal direction of the vibration absorbing hose. The arresting rings are fitted on an outer side of the pressure resistant reinforcement layer at positions of corrugation valleys of the corrugations so as to arrest the corrugation valleys or the pressure resistant reinforcement layer radially respectively. When the corrugations or corrugated portion are elongated in a longitudinal direction of the vibration absorbing hose, the corrugation valleys diametrically enlarge while widening opening angles, and the corrugation hills diametrically contract also while widening opening angles. That is, the corrugated portion tends to be elongated in a longitudinal direction of the vibration absorbing hose with diametrical enlargement of the corrugation valleys and diametrical contract of the corrugation hills. Therefore, if the rigid arresting rings are fitted on an outer side of the corrugation valleys, the corrugation valleys are restrained against motion in diametrically enlarging direction by the arresting rings, and the corrugated portion is favorably restrained from being elongated and deformed. Since the arresting rings not only entirely restrain the corrugated portion, for example, from being diametrically enlarged but also share load on the corrugated portion when internal pressure is exerted thereto, there is obtained another effect that pressure resistance of the vibration absorbing hose is further increased. However, if the arresting rings are not applied, it is effective to form the corrugation hills with large wall thickness, for example, as the corrugation hills have larger load bearing area or larger diametrically enlarging load bearing area and are readily deformed compared to the corrugation valleys.

A vibration absorbing hose according to the present invention may comprise tubular rubber layer having corrugations, reinforcing fabric which is wrapped around an outer surface side of the rubber layer so as to constitute pressure resistant reinforcement layer in laminated relation with the rubber layer, and a plurality of rigid annular arresting rings which are individually arranged along a longitudinal direction of the vibration absorbing hose. The arresting rings are fitted on an outer side of the reinforcing fabric at positions of corrugation valleys of the corrugations so as to arrest the reinforcing fabric radially in order to form the pressure resistant reinforcement layer shaped corresponding to the corrugations. The reinforcing fabric may be formed, for example, by braiding or interlacing reinforcing warp yarns and reinforcing weft yarns. This construction allows to laminate the pressure resistant reinforcement layer very easily. And, torsional stress is not produced in thus constructed hose when internal pressure is exerted thereto. The reinforcing fabric may be wrapped around the outer surface side of the rubber layer so that the reinforcing warp yarns are oriented in a longitudinal direction of the vibration absorbing hose. Here, the reinforcing warp yarns restrain the vibration absorbing hose from being elongated in the longitudinal direction thereof, while the reinforcing weft yarns restrain the vibration absorbing hose from being swollen and deformed radially.

Further, a vibration absorbing hose according to the present invention may comprise tubular rubber layer having corrugations, reinforcing fabric which is wound spirally around an outer surface side of the rubber layer so as to constitute pressure resistant reinforcement layer in laminated relation with the rubber layer, and a plurality of rigid annular arresting rings which are individually arranged along a longitudinal direction of the vibration absorbing hose. The arresting rings may be fitted on an outer side of the reinforcing fabric at positions of corrugation valleys of the corrugations so as to arrest the reinforcing fabric radially in order to form the pressure resistant reinforcement layer shaped corresponding to the corrugations. This construction also allows to laminate the pressure resistant reinforcement layer easily. The reinforcing fabric may be formed, for example, by braiding or interlacing reinforcing warp yarns and reinforcing weft yarns. And, the reinforcing fabric may be wound around the outer surface side of the rubber layer so that the reinforcing warp yarns and reinforcing weft yarns are oriented at inclined angle with respect to a longitudinal direction of the vibration absorbing hose respectively.

Here, the pressure resistant reinforcement layer constituted from the reinforcing fabric and the rigid arresting rings may provide the vibration absorbing hose with favorable pressure resistance and deformation resistant property. The corrugations of the vibration absorbing hose or the rubber layer may be formed so that corrugation hills adjacent in a longitudinal direction of the vibration absorbing hose and the corrugation valleys adjacent in the longitudinal direction thereof are discontinuous and independent each other. That is, in one aspect of the present invention, the pressure resistant reinforcement layer constituted from the reinforcing fabric and the arresting rings may bear the load caused by internal pressure exerted to the vibration absorbing hose, and thereby the pressure resistant strength and the deformation resistant property of the vibration absorbing hose may be enhanced. When the arresting rings keep the corrugation valleys in restrained state against motion in diametrically enlarging direction, the corrugation hills may be effectively restrained from being deformed radially accordingly, for example, expanding radially.

And, there is obtained a merit that the arresting rings which are fitted from an outer side of the pressure resistant reinforcement layer may be adapted as securing means of the pressure resistant reinforcement layer. As the arresting rings are discontinuous and independent each other in the longitudinal direction of the vibration absorbing hose, if one of the arresting rings should be broken, arresting or securing function to the vibration absorbing hose is, for example, lost only partly.

The vibration absorbing hose may further comprise a resin membrane which is laminated in an inner surface of the rubber layer, or on an outer surface of the rubber layer and in an inner side of the pressure resistant reinforcement layer. As in this construction, gas barrier performance is improved by the resin membrane, gas permeation resistance of the vibration absorbing hose may be enhanced, for example, remarkably. The resin membrane may be formed by electrostatic coating or spraying.

In the present invention, preferably, the resin membrane may be formed from polyamide resin or polyamide type resin, or fluoro-resin or fluoro-type resin.

The resin membrane may be formed in such manner that negatively or positively charged resin powder is sprayed to the rubber layer which acts as counter electrode, the resin powder is attached to the inner or outer surface of the rubber layer by electrostatic attraction, and then the attached resin powder is melted by heating and cooled.

However, there are some other means than electrostatic coating to laminate the resin membrane in or on the rubber layer. The resin membrane may be formed in the inner surface or on the outer surface of the rubber layer by injection molding. Or the resin membrane may be formed in such manner that parison is formed by extruding a molten resin with an extruder and the parison is attached and laminated in the inner surface or on the outer surface of the rubber layer by blow molding.

A wall thickness or thickness of the resin membrane is preferably maximum 0.3 mm or 300 $\mu$m. The reason is that as the wall thickness is larger, the vibration absorbing hose becomes entirely hard or stiff, and vibration absorbing property is deteriorated. By employing electrostatic coating, it is possible to form the resin membrane easily with thin and uniform wall thickness.

However, in the present invention, more preferably the resin membrane has a thickness of 50 $\mu$m to 250 $\mu$m. If the resin membrane has a thickness smaller than 50 $\mu$m, sufficient gas permeation resistance cannot be obtained. On the contrary, if the resin membrane has a thickness larger than 250 $\mu$m, gas permeation resistance is favorable, but vibration absorbing property of the hose is deteriorate as the resin membrane becomes hard or stiff according to circumstances.

Here, in order to form the resin membrane favorably by electrostatic coating, the rubber layer is formed preferably to have a volume resistivity value of maximum $1 \times 10^6 \Omega$-cm. The volume resistivity value in the rubber layer may be controlled by adjusting blending quantity of carbon black therein. The rubber layer where the volume resistivity value is adjusted to maximum $1 \times 10^6 \Omega$-cm in this manner may result in favorable electrostatic coating of resin powder, restraint of defects such as uneven wall thickness or pinholes, and therefore favorable gas permeation resistance.

It is effective to form the rubber layer so as to have a larger wall thickness in corrugation hills of the corrugations than in corrugation valleys thereof. The corrugation hills define large diameter portions and therefore gas easily permeates therethrough (for example, gas permeates a lot there). However, in this construction as wall thickness of the corrugation hills is increased, gas permeation resistance of the hose may be effectively raised. On the contrary, the corrugation valleys define small diameter portions and therefore gas hardly permeates therethrough (for example, gas permeates a little there). Therefore, it is not necessary to design the corrugation valleys to have a wall thickness as large as the corrugation hills. And, if wall thickness of the corrugation valleys is designed small, a hose may be formed accordingly not too hard. In addition, the corrugation hills are effectively prevented from being diametrically contracted and deformed when internal pressure is exerted to the hose, and thereby the vibration absorbing hose is further restrained from being deformed in a longitudinal direction thereof The wall thickness in the corrugation hills is preferably designed 1.2 to 6.0 times as large as that in the corrugation valleys. If the wall thickness in the corrugation hills is under 1.2 times as large as that in the corrugation valleys, gas permeation resistance might be lowered in the corrugation hills. If it is over 6.0 times as large as that in the corrugation valleys, too large wall thickness in the corrugation hills might lower flexibility of the vibration absorbing hose. More specifically, it is effective that the wall thickness in the corrugation hills is designed 1.5 to 3.0 times as large as that in the corrugation valleys.

According to the present invention, provided is a vibration absorbing hose having sufficient flexibility, and bursting pressure of minimum 1 MPa. The vibration absorbing hose of the present invention is specifically suitable for application of plumbing in an engine room of a motor vehicle with construction which is suitable for plumbing hose to be arranged in an engine room of a motor vehicle.

Figure 1:
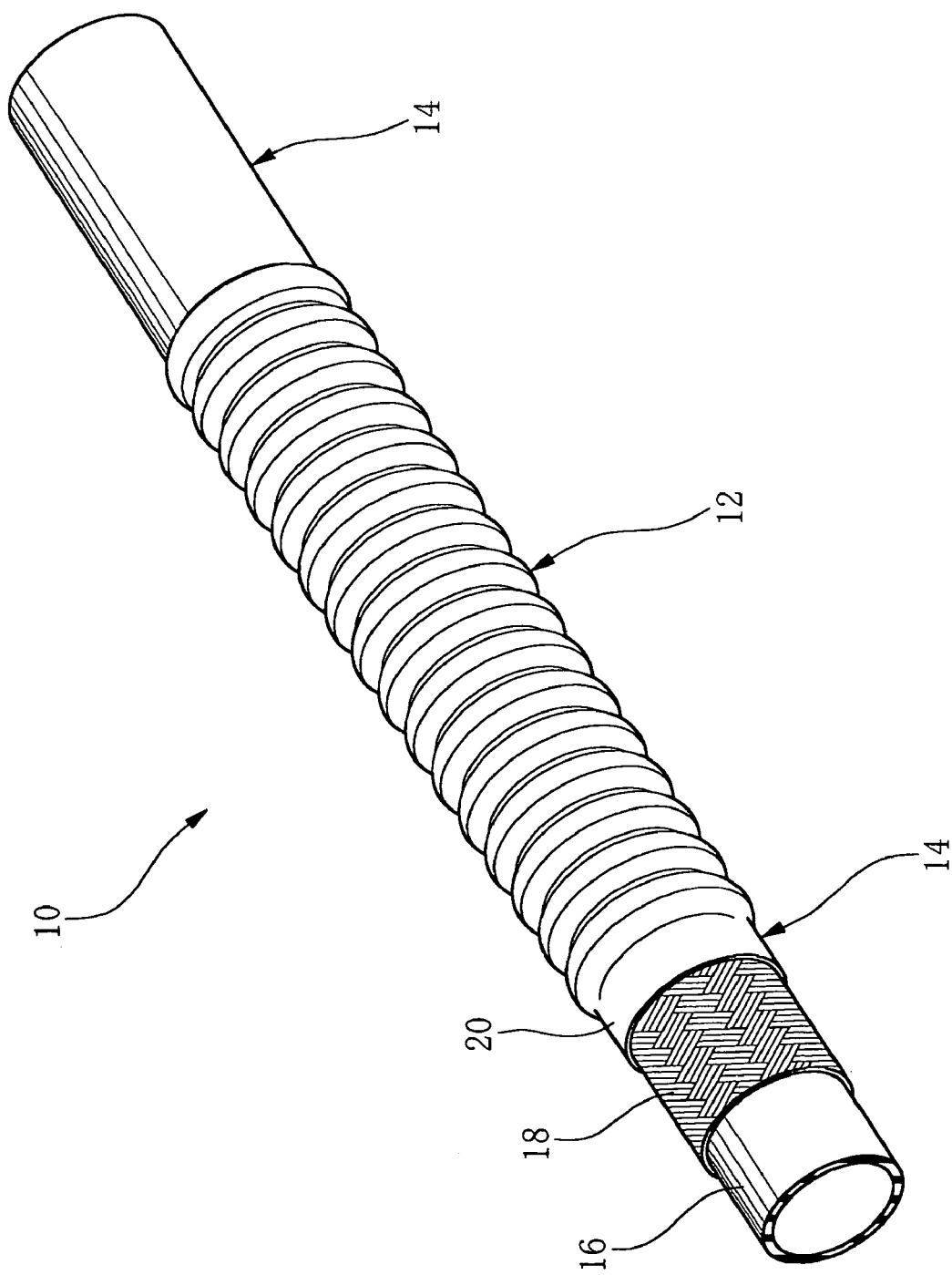
FIG. 1 is a partly cutaway perspective view of a first vibration absorbing hose according to the present invention.

Now, the preferred embodiments of the present invention will be described in detail with reference to the drawings.

DETAILED DESCRIPTIONS OF PREFERRED EMBODIMENTS

A first vibration absorbing hose 10 (hereinafter simply referred to as a first hose 10) according to the present invention shown in FIGS. 1 and 2, which is applied, for example, as refrigerant conveying hose (air conditioning hose), is provided with pressure resistance. The first hose 10 has a corrugated portion 12 extending relatively long or for substantially entire part of the first hose 10, and end portions 14, 14 of straight-sided tubular shape or straight cylindrical shape. The first hose 10 has multi-layered construction, tubular inner rubber layer (inner rubber-elastic-material layer) 16 (rubber layer), pressure resistant reinforcement layer 18 which circumscribes an outer side of the inner rubber layer 16, and outer rubber layer (outer rubber-elastic-material layer) 20 as outermost cover layer.

In the first hose 10, the pressure resistant reinforcement layer 18 is formed or constructed by braiding reinforcing yarns or filament member 22 (refer to FIG. 3) over and along an outer surface of the tubular inner rubber layer 16, more specifically along straight cylindrical shape of the both end portions 14, 14 and corrugations therebetween. Therefore, the pressure resistant reinforcement layer 18 is formed in straight cylindrical shape at both end portions 14, 14 and in shape corresponding to corrugations or in corrugated shape, for example, in shape having corrugation hills and valleys in the corrugated portion 12 between the both end portions 14, 14. The pressure resistant reinforcement layer 18 is laminated on an outer side of the inner rubber layer 16 entirely in contact or close contact relation with the outer surface thereof.

The inner rubber layer 16 in the first hose 10 may be formed from isobutylene-isoprene rubber (IIR), halogenated IIR (chloro-IIR (Cl-IIR or CIIR), bromo-IIR (Br-IIR or BIIR)), acrylonitrile-butadiene-rubber (NBR), chloroprene rubber (CR), ethylene-propylene-diene-rubber (EPDM), ethylene-propylene copolymer (EPM), fluoro rubber (FKM), epichlorohydrin rubber or ethylene oxide copolymer (ECO), silicon rubber, urethane rubber, acrylic rubber or the like. These materials are applied in single or blended form for the inner rubber layer 16.

For the reinforcing yarns or filament member 22 forming the pressure resistant reinforcement layer 18, polyethylene terephthalate (PET), polyethylene naphthalate (PEN), aramid, polyamide or nylon (PA), vynilon, rayon, metal wire or the like may be adapted.

The outer rubber layer 20 may be formed also from every kind of rubber materials cited above as material for the inner rubber layer 16. In addition, heat-shrink tube and thermoplastic elastomer (TPE) tube are also applicable for the outer rubber layer 20. As for material of such heat-shrink tube and TPE tube, acryl type, styrene type, olefin type, diolefin type, polyvinyl chloride type, urethane type, ester type, amide type, fluorine type or the like may be applied. According to this embodiment, the first hose 10 is designed to have an inner diameter of approximately 5 mm to 50 mm.

The inner rubber layer 16 is formed normally from material suitably selected according to a fluid flowing inside thereof However, in case that the first hose 10 is applied for hydrofluorocarbon (HFC) type refrigerant conveying hose, specifically IIR or halogenated IIR in single or blended form may be preferably used. It is also effective to apply IIR or halogenated IIR in single or blended form to the outer rubber layer 20.

Figure 2:
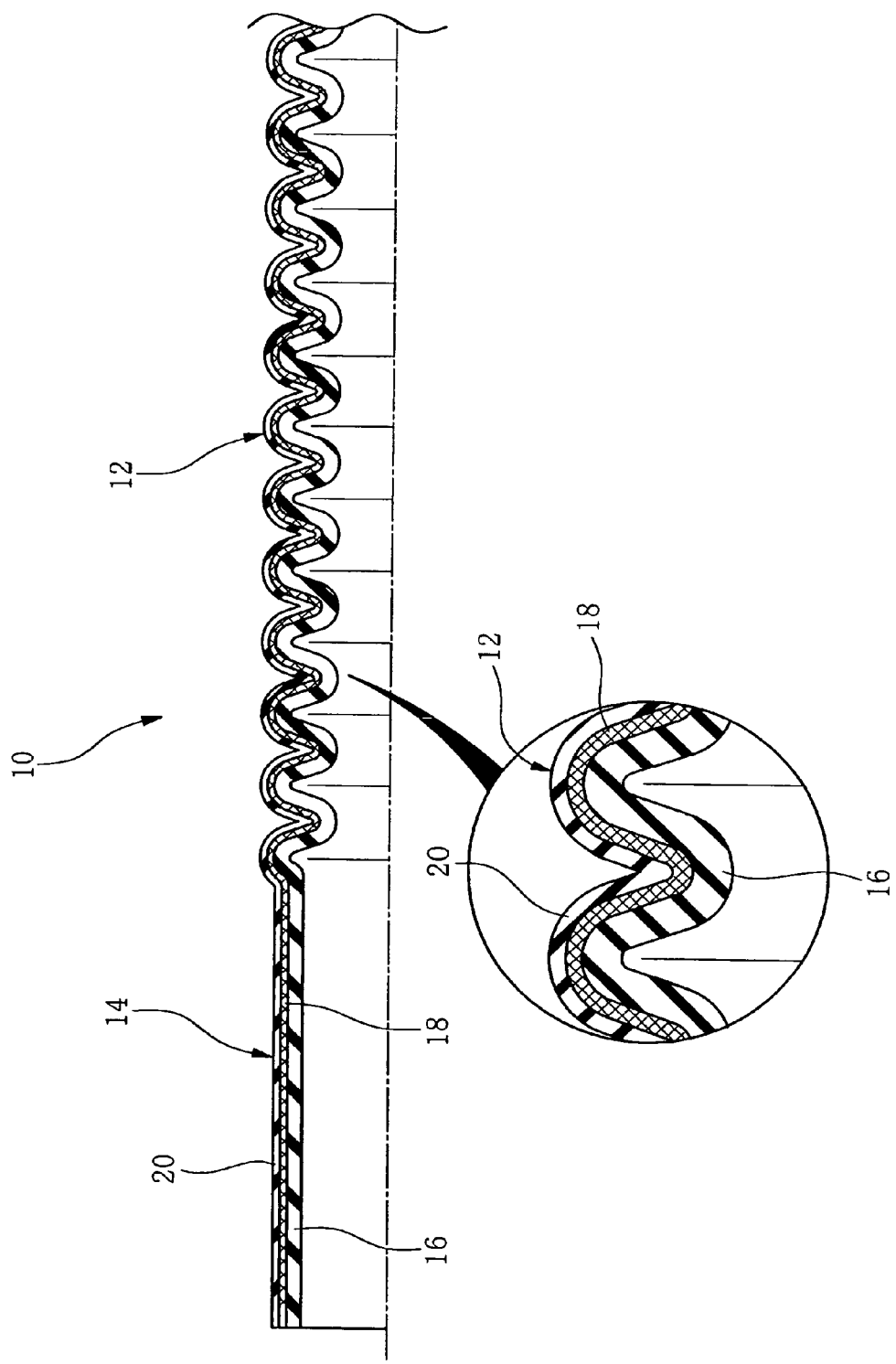
FIG. 2 is a sectional view of the first vibration absorbing hose.

The first hose 10 as shown in FIGS. 1 and 2 may be manufactured, for example, in the following manner. First, the inner rubber layer 16 including corrugated portion is formed by injection molding, blow molding or the like.

Figure 3:
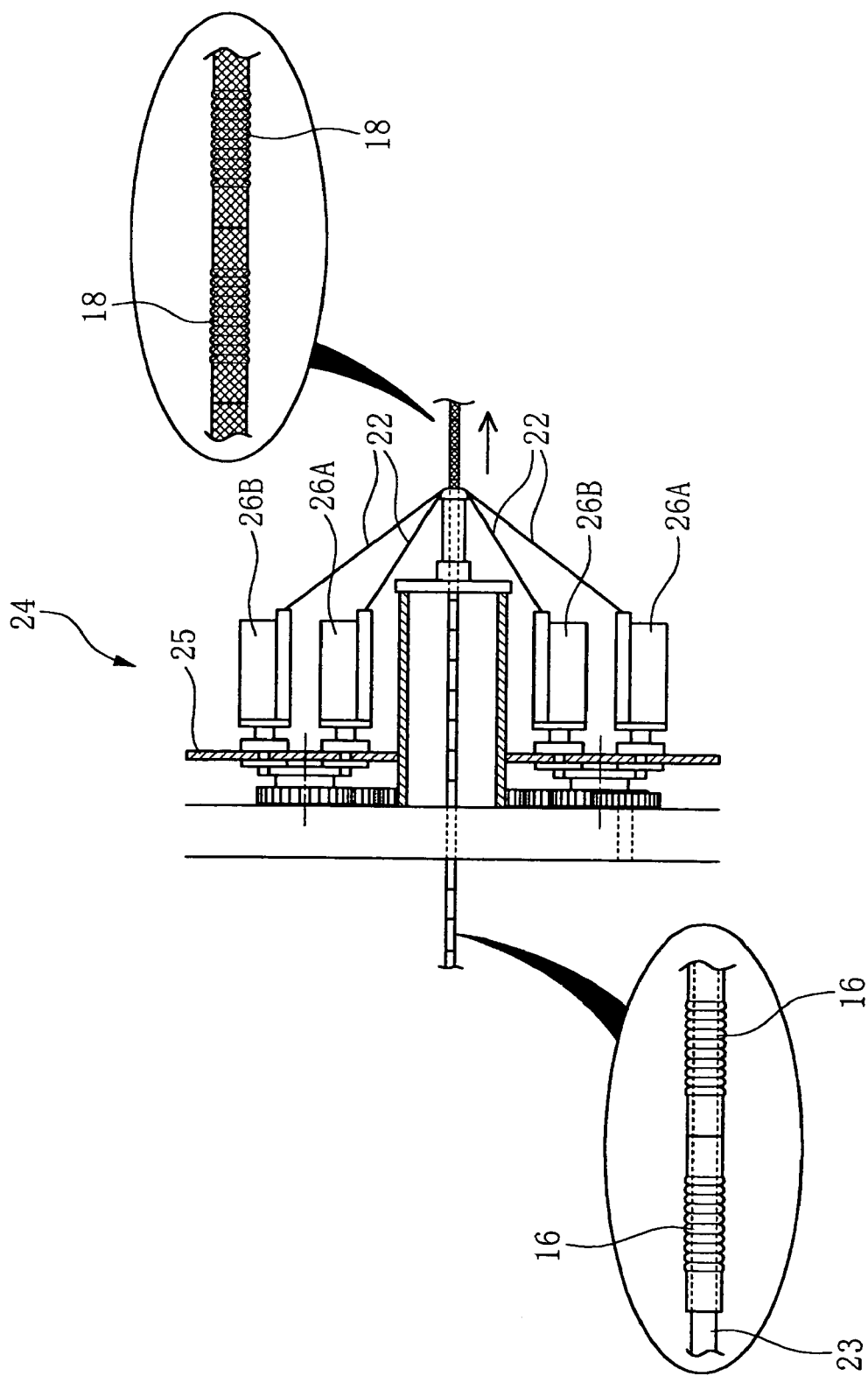
FIG. 3 is an explanatory view showing a relevant part of one production process of the first vibration absorbing hose.

The molded inner rubber layer 16 is slid on a long mandrel (for example, resin mandrel) 23 as shown FIG. 3. Next, the mandrel 23 with the inner rubber layer 16 thereon is mounted in a center hole of a braiding machine 24 shown in FIG. 3. Then, the mandrel 23 is carried forward. The reinforcing yarns 22 are braided on the outer surface of the inner rubber layer 16 as the mandrel 23 is carried.

The braiding machine 24 has a disk-like deck plate 25 and a plurality of paired carriers 26A and 26B which are disposed along a circumference of the deck plate 25. The carriers 26A and 26B of each pair follow a figure of eight respectively while the deck plate 25 rotates around the center thereof, and thereby the reinforcing yarns 22 are braided on the outer surface of the inner rubber layer 16. During braiding procedure, a pulling speed of the reinforcing yarns 22 is controlled so that braiding angle is generally equal in the corrugation hills and valleys of the corrugated portion 12, between the corrugation hills and valleys, or throughout entire corrugated portion 12. Here, the reinforcing yarn or yarns 22 are braided closely and intimately such that rubber layer 16 is not seen therethrough.

And, the inner rubber layer 16 which is laminated with the pressure resistant reinforcement layer 18 by braiding the reinforcing yarns 22 on an outer surface thereof as stated above is then dipped into a liquid compound for the outer rubber layer 20 subsequently to be coated with the outer rubber layer 20 on an outer side thereof Next, the product laminated with the outer rubber layer 20 is put into a dry kiln for drying.

After dried, the mandrel 23 is removed and an elongate multi-layered hose product is obtained. Then, for example, the hose product is cut into desired length and thereby the first hose 10 shown in FIGS. 1 and 2 is obtained. This is one example of production methods of the first hose 10. The first hose 10 may be produced in any other methods.

The first hose 10 in the above-mentioned embodiment may ensure favorable flexibility of itself by the corrugated portion 12. Accordingly, if the first hose 10 is designed short in length, favorable vibration absorbing property may be ensured in the first hose 10. That means, the first hose 10 ensures favorable vibration absorbing property while the required hose length is shortened. This may solve problem with respect to plumbing design in an engine room of a motor vehicle or handling of a plumbing hose during mounting of the plumbing hose.

Additionally, it also increases freedom to design plumbing layout to enable the required hose length short. And, favorable pressure resistance may be ensured by the pressure resistant reinforcement layer 18 formed by braiding the reinforcing yarns 22 along the corrugations.

In the first hose 10, the pressure resistant reinforcement layer 18 may be laminated on the outer surface side of the inner rubber layer 16 in shape favorably along the corrugations or favorable corrugated shape so as to reinforce uniformly the corrugation hills and valleys in the corrugated portion 12 and there is no poor reinforcement region. So, as the first hose 10 does not have a portion which is easily broken or cracked when internal pressure is exerted to the first hose 10, the first hose 10 has improved overall pressure resistance. At the same time, as the pressure resistant reinforcement layer 18 is formed in shape corresponding to the corrugations or in corrugated shape along the corrugated portion 12 of the inner rubber layer 16, there is no problem that flexibility originated with the corrugated portion 12 is largely disturbed by providing the pressure resistant reinforcement layer 18.

Furthermore, as the pressure resistant reinforcement layer 18 may be formed seamless and continuous in both circumferential and longitudinal directions, the pressure resistant reinforcement layer 18 may enhance pressure resistance of the first hose 10 effectively. And, in production process of the first hose 10, the pressure resistant reinforcement layer 18 may be formed easily, and thereby the production cost of the first hose 10 is lowered.

Figure 4:
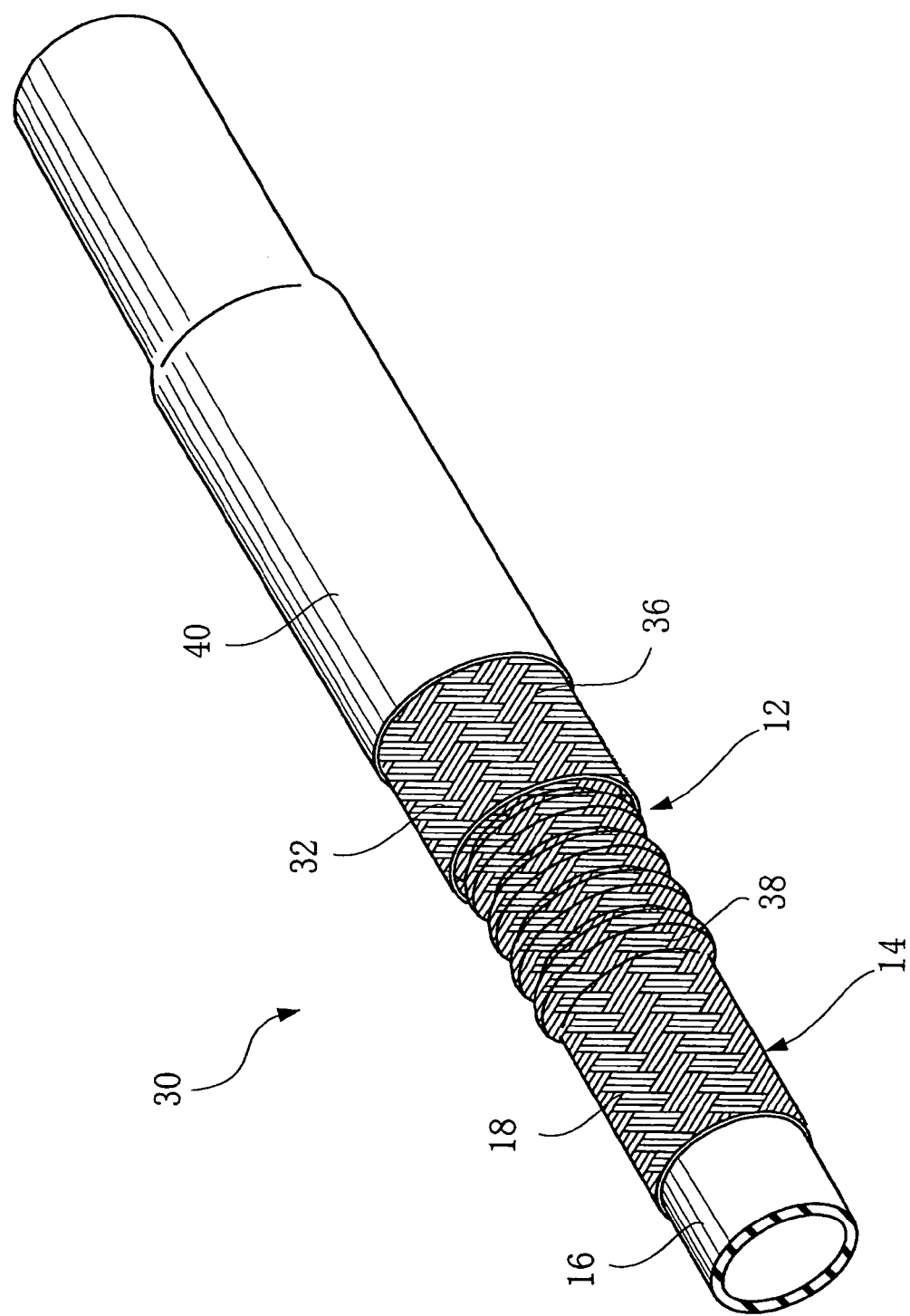
FIG. 4 is a partly cutaway perspective view of a second vibration absorbing hose according to the present invention.
Figure 5:
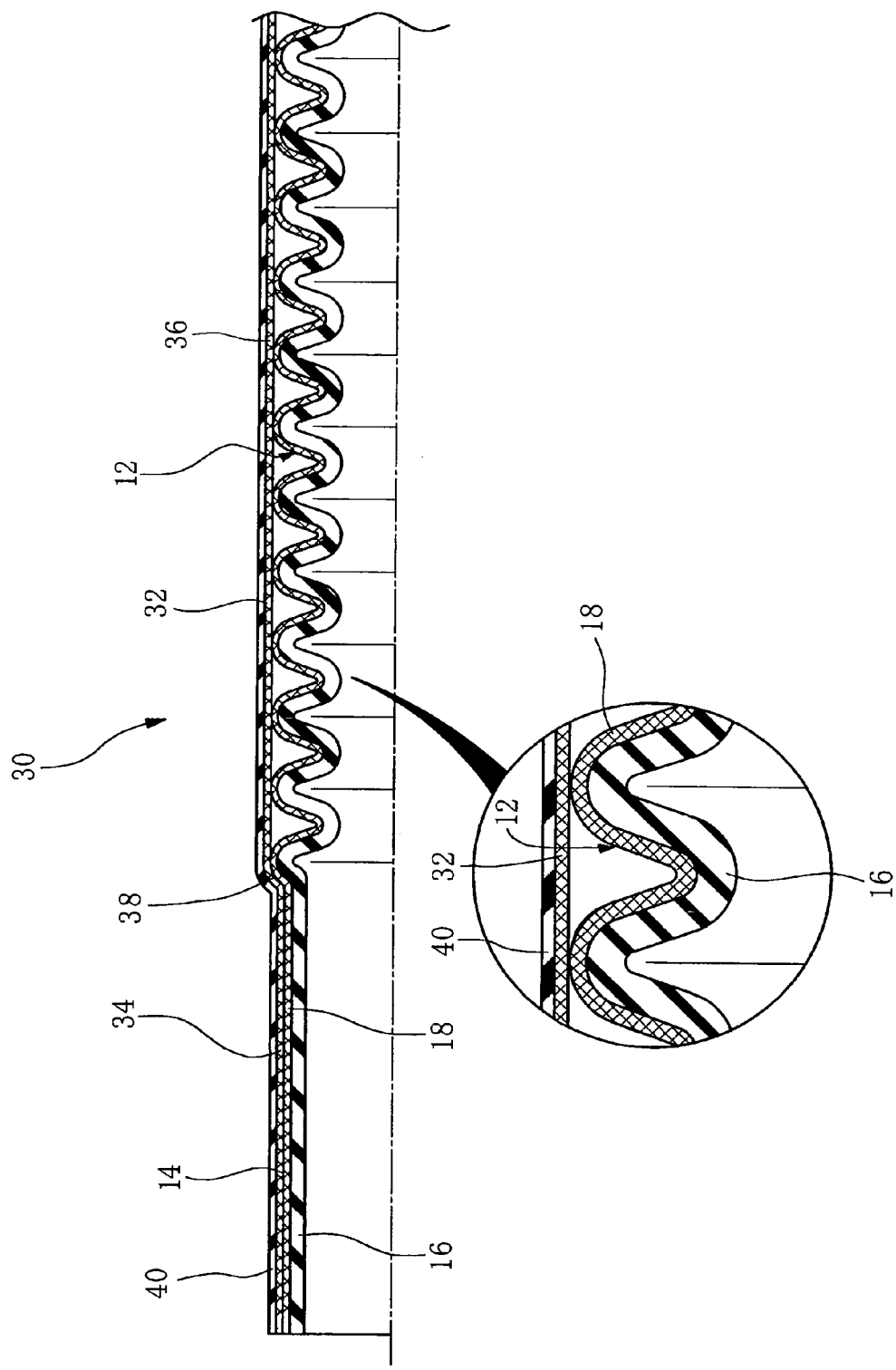
FIG. 5 is a sectional view of the second vibration absorbing hose, taken along a longitudinal direction thereof
Figure 6:
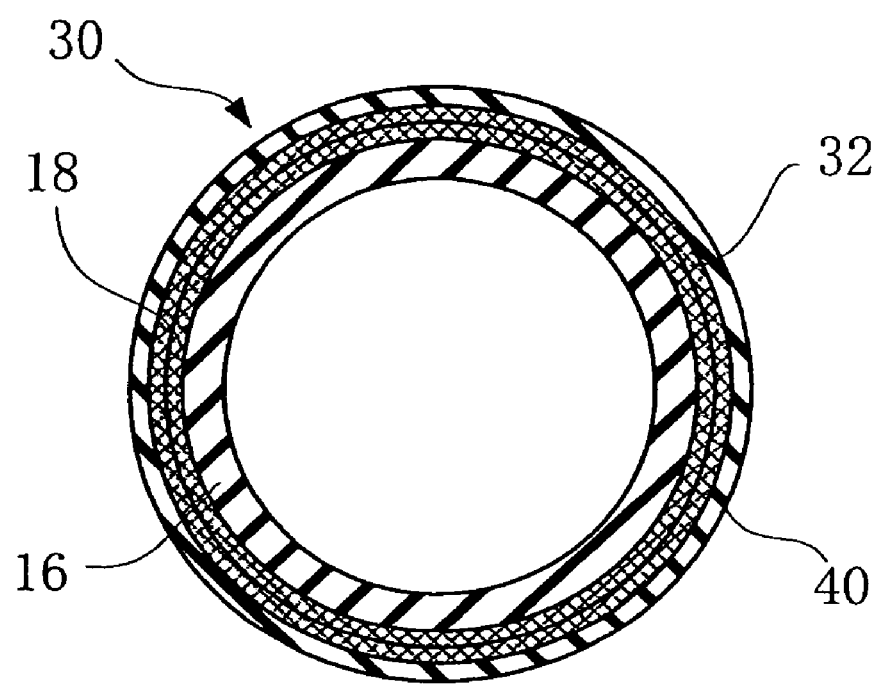
FIG. 6 is a sectional view of the second vibration absorbing hose, taken along a radial direction thereof.

FIGS. 4, 5 and 6 show a second vibration absorbing hose 30 (hereinafter simply referred to as a second hose 30) according to the present invention. The second hose 30, which is applied, for example, as refrigerant conveying hose (air conditioning hose), is provided with pressure resistance. The second hose 30 is formed by modifying layered or laminated construction on an outer side of the pressure resistant reinforcement layer 18 of the first hose 10. Therefore, portions with configuration identical to the first hose 10 (including portions which are preferred to be given identical reference numerals to the first hose 10 for better understanding of the present invention) are roughly given identical reference numerals and explanations on them are occasionally omitted.

In the second hose 30, the outer rubber layer (outer rubber-elastic-material layer) 20 is not laminated on the outer surface of the pressure resistant reinforcement layer 18. Instead, another separate reinforcement layer 32 is laminated thereon. The another separate reinforcement layer 32 is formed in generally straight cylindrical shape. The another separate reinforcement layer 32 extends with covering the pressure resistant reinforcement layer 18 in contact relation with the pressure resistant reinforcement layer 18 at corrugation hills (corrugation hill tops: refer to reference numeral 60 in FIG. 10), for example, in close contact relation therewith at corrugation hills and in spaced relation therewith at corrugation valleys (refer to an enlarged fragmentary view in FIG. 5, and to reference numeral 62 in FIG. 10). The another separate reinforcement layer 32 is formed in a small-diameter cylindrical shape at both end portions 34, 34 so as to contact closely with the both straight cylindrical end portions 14, 14 of the inner rubber layer 16 and the pressure resistant reinforcement layer 18, in a large-diameter cylindrical shape in a middle portion or a long middle portion 36 so as to contact closely with the corrugation hills of the corrugations (corrugated portion 12) which extend relatively long or for generally entire part of the inner rubber layer 16 and the pressure resistant reinforcement layer 18, and in generally frustoconical shape (or diametrically expanding shape) in a bordering portions respectively between the end portion 34 and the middle portion 36 so as to contact closely with diametrically enlarging portion 38 between the straight cylindrical end portion 14 and outer end corrugation hill of the corrugations. In the second hose 30, an outer rubber layer (outer rubber-elastic-material layer) 40 is further laminated on an outer side of the another separate reinforcement layer 32 as an outermost covering layer.

In the second hose 30, just like in the first hose 10, the pressure resistant reinforcement layer 18 is formed by braiding the reinforcing yarns 22.

The another separate reinforcement layer 32 may be formed also by braiding reinforcing yarns 22. However, other reinforcing yarns which are different from the reinforcing yarns 22 in material or the like may be also applied.

And, the outer rubber layer 40 may be formed also from the same rubber materials, heat-shrink tube, TPE and TPE tube as the outer rubber layer 20 in the first hose 10. Further, needless to say, the inner rubber layer 16, the reinforcement yarn 22 and the pressure resistant reinforcement layer 18 may be formed from the same material as in the first hose 10. In this embodiment, the second hose 30 is designed to have an inner diameter of approximately 5 mm to 50 mm The second hose 30 shown in FIGS. 4, 5 and 6 is manufactured, for example, in the following manner. Just like the first hose 10, the inner rubber layer 16 is formed, and the pressure resistant reinforcement layer 18 is formed and laminated on the outer surface of the inner rubber layer 16 by braiding the reinforcing yarns 22 with the braiding machine 24.

Then, the another separate reinforcement layer 32 is further formed on an outer side of the pressure resistance reinforcement layer 18 by braiding the reinforcing yarns 22 with braiding machine 24. And, the inner rubber layer 16 which is laminated with the pressure resistant reinforcement layer 18 and the another separate reinforcement layer 32 is then dipped into a liquid compound for the outer rubber layer 40 subsequently to be coated with the outer rubber layer 40 on an outer side of the another separate reinforcement layer 32. Next, the product laminated with the outer rubber layer 40 is put into a dry kiln for drying. However, it is possible not to provide the outer rubber layer 40.

After dried, the mandrel 23 is removed and a multi-layered hose product, for example, an elongate multi-layered hose product is obtained.

Then, for example, the hose product is cut into desired length and thereby the second hose 30 shown in FIGS. 4, 5 and 6 is obtained. This is one example of production methods of the second hose 30. The second hose 30 may be produced in any other methods.

The second hose 30 in this embodiment of the present invention as stated above may also provide the same or the substantially the same effects as the first hose 10.

Moreover, the another separate reinforcement layer 32 may effectively restrain the second hose 30 from being elongated in a longitudinal direction thereof

EXAMPLES 1 and 2

Some hoses with various constructions shown in Table 1 are formed, and they are evaluated with respect to elongation rate, bursting pressure (pressure resistance) and impulse durability (impulse resistance). The hoses of Example 1 and Comparative Example A are evaluated with respect to vibration absorbing property. In Table 1, in case that an initial hose length is changed into a length $\beta$ after water pressure 2.9 Mpa is exerted for five minutes internally to a hose with the initial hose length a, elongation rate is indicated by a formula $(\beta-a) \times 100/a$. Hose length a and $\beta$ is substantial hose length. The impulse durability (impulse resistance) indicates a state of a hose in case that oil pressure between 0 to 2.9 Mpa is repeatedly exerted internally to each of the hoses through a oil tank while keeping a temperature of oil in the oil tank at 100° C. With regard to a first reinforcement layer (pressure resistant reinforcement layer 18 in Example 1 of the first hose 10 and Example 2 of the second hose 30), and a second reinforcement layer (another separate reinforcement layer 32), in the line "No. of yarns" of Table 1, "3 (4) yarns×48 (24) carriers" means that 3 (4) parallel reinforcing yarns of 1000 denier (de) or 2000 de are braided on an 48(24)-carrier machine. And, "inner layer" of Example 1 and Example 2 corresponds, for example, to the inner rubber layer 16, while "outer surface layer" of Example 1 and Example 2 corresponds, for example, to the outer rubber layer 20, 40.

With regard to first reinforcement layer of Comparison Example B, in the line "No. of yarns", "22 yarns+22 yarns" means that 22 yarns of 3000 de are wound spirally or helically or spiraled around inner and outer sides of an intermediate rubber layer respectively.

Value of bursting pressure indicates water pressure value which causes a hose to burst when water pressure is exerted internally to the hose at pressurizing speed of 160 Mpa/minute.

TABLE 1

|  | Example 1 | | Example 2 | |
| --- | --- | --- | --- | --- |
|  | A | A | B | C |
| Shape | Corrugated | Corrugated | Corrugated | Corrugated |
| Length of corrugated portion (mm) | 100 | 100 | 100 | 100 |
| Hose length (mm) | 150 *1 | 150 *1 | 150 *1 | 150 *1 |

TABLE 1-continued

| Section | Property | | | | |
|---|---|---|---|---|---|
| Dimension | Inner diameter (mm) | ø9.0 (valley) | ø9.0 (valley) | ø9.0 (valley) | ø9.0 (valley) |
| | Outer diameter (mm) | ø20.0 (hill) | ø20.0 (hill) | ø20.0 (hill) | ø20.0 (hill) |
| Inner layer | Material | IIR | IIR | IIR | IIR |
| | Wall thickness (mm) | 1.0 | 1.0 | 1.0 | 1.0 |
| First reinforcement layer | Material | PET | PET | PET | PET |
| | Denier (de) | 1000 | 1000 | 1000 | 1000 |
| | No. of yarns | 3 yarns × 48 carriers | 3 yarns × 48 carriers | 3 yarns × 48 carriers | 3 yarns × 48 carriers |
| | Construction | Braided | Braided | Braided | Braided |
| Second reinforcement layer | Material | Non | PET | PET | PET |
| | Denier (de) | — | 1000 | 1000 | 1000 |
| | No. of yarns | — | 3 yarns × 48 carriers | 3 yarns × 48 carriers | 3 yarns × 48 carriers |
| | Braid angle | — | 60° | 50° | 30° |
| | Construction | — | Braided | Braided | Braided |
| Outer surface layer | Material | Silicon type | Silicon type | Silicon type | Silicon type |
| | Wall thickness (mm) | 0.5 | 0.5 | 0.5 | 0.5 |
| Elongation rate 2.9 MPa × 5 minutes | | +34% | +16% | +1.5% | −1.1% |
| Bursting pressure (MPa) | | 17.9 | 32.9 | 38.9 | 29.6 |
| Impulse durability temperature (oil, tank) 100° C., 0 MPa <--> 2.9 MPa | | Burst at 120,000 cycles | Burst at 240,000 cycles | Not burst at 300,000 cycles | Not burst at 300,000 cycles |

| | | Comparison Example | | |
|---|---|---|---|---|
| | | A | B | C |
| Shape | | Cylindrical | Cylindrical | Corrugated |
| Length of corrugated portion (mm) | | — | — | 200 |
| Hose length (mm) | | 450 | 450 | 300 |
| Dimension | Inner diameter (mm) | ø12.0 | ø14.5 | ø25.0 (valley) |
| | Outer diameter (mm) | ø19.5 | ø22.0 | ø50.0 (hill) |
| Inner layer | Material | PA6 alloy/IIR *2 | IIR | NBR |
| | Wall thickness (mm) | 0.18/1.2 | 1.7 | 3.0 |
| First reinforcement layer | Material | PET | PET | Non |
| | Denier (de) | 2000 | 3000 | — |
| | No. of yarns | 4 yarns × 24 carriers | 22 yarns + 22 yarns | — |
| | Construction | Braided | Spiraled | — |
| Second reinforcement layer | Material | Non | Non | Non |
| | Denier (de) | — | — | — |
| | No. of yarns | — | — | — |
| | Braid angle | — | — | — |
| | Construction | — | — | — |
| Outer surface layer | Material | EPDM | EPDM | Non |
| | Wall thickness (mm) | 1.4 | 1.0 | — |
| Elongation rate 2.9 MPa × 5 minutes | | +1.2% | +2.1% | Not measured due to bursting |
| Bursting pressure (MPa) | | 28.8 | 14.5 | 0.1 |
| Impulse durability temperature (oil, tank) 100° C., 0 MPa <--> 2.9 MPa | | Not burst at 300,000 cycles | Not burst at 300,000 cycles | Not measured due to bursting |

Figure 7:
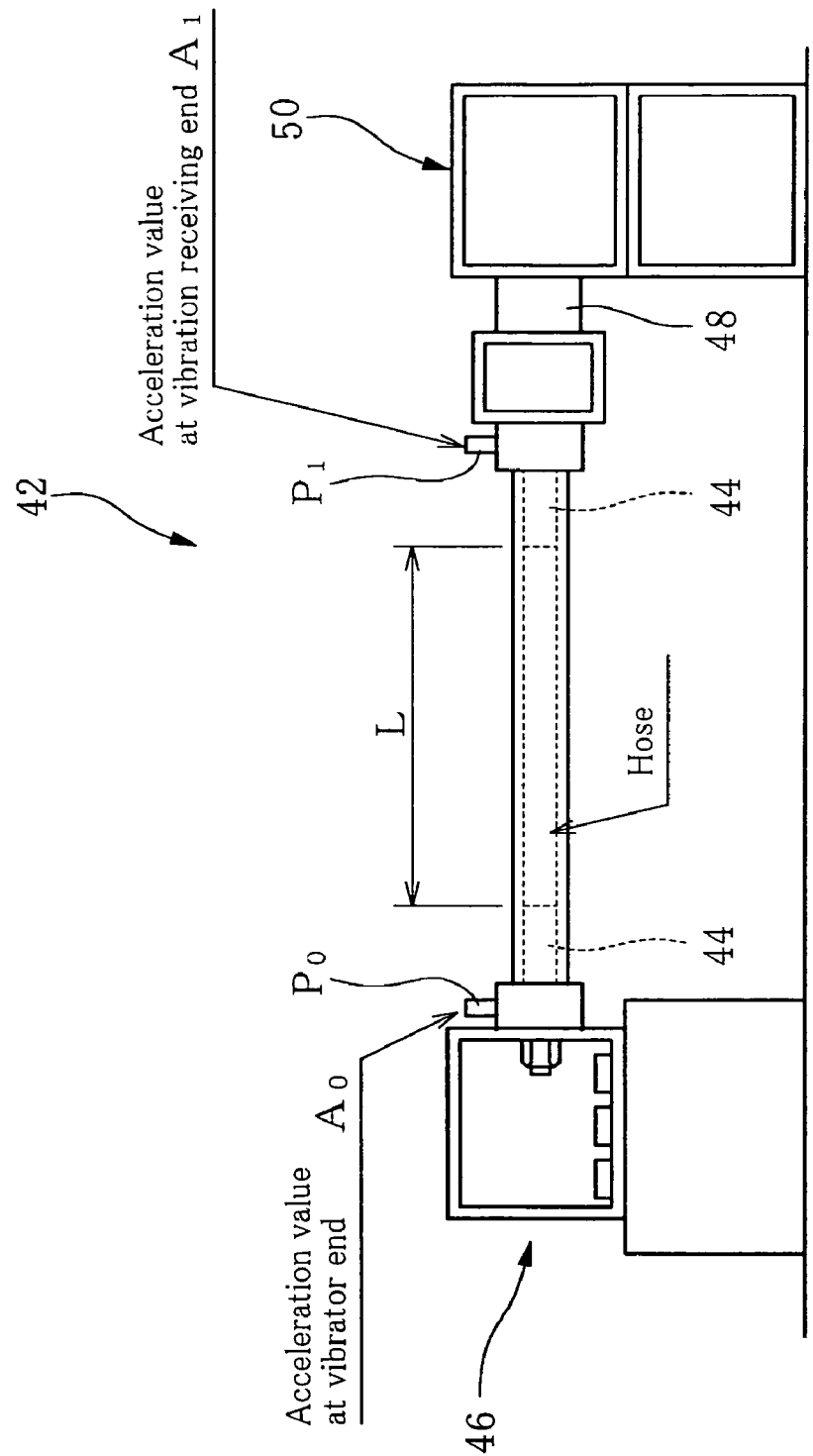
FIG. 7 is an explanatory view showing measuring method of vibration absorbing properties of example and comparison example hoses along with a measuring equipment.

Note:
*1: Opposite ends of 25 mm are portions to be clamped respectively. Therefore, substantial hose length is 100 mm.
*2: IIR - inner rubber layer PA6 alloy—resin inner layer or resin membrane laminated in an inner surface of the inner rubber layer Meanwhile, the vibration absorbing property is evaluated by means of a measuring equipment 42 shown in FIG. 7. Specifically, each hose of Example 1 (the first hose 10) and Comparison Example A are set on the measuring equipment 42 with opposite ends thereof being fixed to metal cores 44, 44 respectively. L in FIG. 7, for example, indicates substantial hose length. And, while one end of the hose is vibrated by a vibrator 46 and the other end of the hose receives vibration, acceleration value $A_0$ at a vibrator end is measured at measuring point $P_0$ of a vibrator end and acceleration value $A_1$ at a vibration receiving end is measured at measuring point $P_1$ of a vibration receiving end respectively. Then vibration transfer functions or transfer functions are calculated based on these values. The results are shown in a graph of FIG. 8. In FIG. 7, numeral reference 48 indicates a rubber member and numeral reference 50 a platen box.

Figure 8:
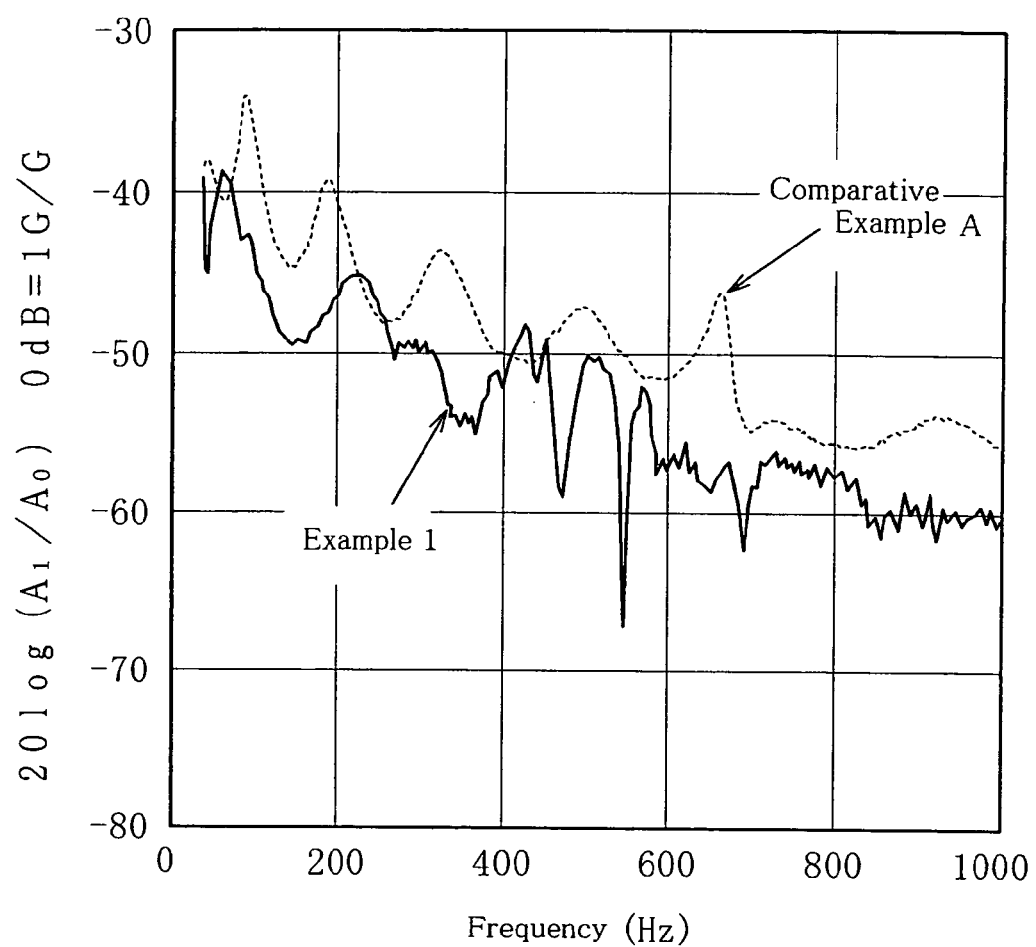
FIG. 8 is a graph showing vibration absorbing properties of the first vibration absorbing hose obtained by the measuring method of FIG. 7.

As shown in Table 1, the hose A of Example 1 exhibits excellent pressure resistance of bursting pressure 17.9 MPa. Although the hose A of Example 1 has a length much shorter than the hose A of Comparative Example, the graph in FIG. 8 shows excellent vibration absorbing property of the hose A of Example 1. And the hoses A, B and C of Example 2 (the second hose 30) have further excellent pressure resistance of bursting pressure minimum 29.6 Mpa.

The hoses A, B and C of Example 2 exhibit excellent elongation rate of maximum 16% and have superior elongation resistant property compared to the hose C of Comparison Example and the hose A of Example 1. The hoses B and C of Example 2 having second reinforcement layer which is braided at braid angle lower than neutral angle exhibit excellent elongation rate of +1.5% and −1.1% and have superior elongation resistant property. Further, all the hoses A, B and C of Example 2 exhibit bursting pressure of minimum 29.6 MPa, and have superior pressure resistance compared to the hoses A, B and C of Comparative Example and the hose A of Example 1. Yet further, all the hoses A, B and C of Example 2 exhibit impulse durability (impulse resistance) of minimum 240,000 cycles and are superior in durability compared to the hose C of Comparison Example and the hose A of Example 1.

In the first hose 10 and the second hose 30, the pressure resistant reinforcement layer 18 or the another separate reinforcement layer 32 may be formed also by winding the reinforcing yarn 22 spirally, spiraling it, or knitting it. Here, the reinforcing yarns 22 may be wound spirally in one direction to form first layer and in the reverse direction to form second layer respectively. And, the first layer and the second layer may constitute the pressure resistant reinforcement layer 18 or the another separate reinforcement layer 32.

A third vibration absorbing hose 52 (hereinafter simply referred to as a third hose 52) according to the present invention shown in FIGS. 9, 10 and 11, which is applied, for example, as refrigerant conveying hose (air conditioning hose), is provided with pressure resistance. The third hose 52 is formed by modifying configuration of the pressure resistant reinforcement layer 18 of the first hose 10. Therefore, portions with configuration identical to the first hose 10 (including portions which are preferred to be given identical reference numerals to the first hose 10 for better understanding of the present invention) are roughly given identical reference numerals and explanations on them are occasionally omitted. The third hose 52 has a corrugated portion 54 extending relatively long or for substantially entire part of the third hose 52, and end portions 14, 14 of straight-sided tubular shape or straight cylindrical shape. The third hose 52 has multi-layered construction, tubular inner rubber layer 16, pressure resistant reinforcement layer 56 which circumscribes an outer side of the inner rubber layer 16, and outer rubber layer 20 as outermost cover layer.

In the third hose 52, the pressure resistant reinforcement layer 56 is formed or constructed by braiding reinforcing yarns or filament member 22 (refer to FIG. 3) over and along an outer surface of the tubular inner rubber layer 16, more specifically along straight cylindrical shape of the both end portions 14, 14 and corrugations therebetween. Therefore, the pressure resistant reinforcement layer 56 is formed in straight cylindrical shape at both end portions 14, 14 and in shape corresponding to the corrugations or in corrugated shape, for example, in shape having corrugation hills and valleys in the corrugated portion 54 between the both end portions 14, 14. The pressure resistant reinforcement layer 56 is laminated on an outer side of the inner rubber layer 16 entirely in contact or close contact relation with the outer surface thereof The pressure resistant reinforcement layer 56 is formed including longitudinally oriented reinforcement yarns 58 which run in a longitudinal direction of the third hose 52 (a direction of a length of the third hose 52) as shown in FIGS. 10 and 11. In this embodiment, the longitudinally oriented reinforcement yarns 58 are, as shown in FIG. 11, arranged in four positions spaced circumferentially 90° apart on a circumference or outer periphery of the pressure resistant reinforcement layer 56 or the inner rubber layer 16. The longitudinally oriented reinforcement yarns 58 are interlaced in combination with reinforcing yarns 22 or arranged in the reinforcing yarns 22 at these four circumferential positions during braiding the pressure resistant reinforcement layer 56. The pressure resistant reinforcement layer 56 is formed, more specifically, by these longitudinally oriented reinforcement yarns 58 and the reinforcing yarns 22. The longitudinally oriented reinforcement yarns 58 may be arranged in three circumferential positions or in more than four circumferential positions, for example, in eight circumferential positions in the pressure resistant reinforcement layer 56.

The inner rubber layer 16 in the third hose 52, needless to say, may be formed from same materials as in the first hose 10.

The longitudinally oriented reinforcement yarns 58 and the reinforcing yarns 22 which form the pressure resistant reinforcement layer 56 may be formed from PET, PEN, aramid, PA, vynilon, rayon, metal wire or the like. Namely, the pressure resistant reinforcement layer 56 may be formed from the same material as the pressure resistant reinforcement layer 18. And, the outer rubber layer 20, needless to say, may be formed also from the same materials as in the first hose 10.

In the third hose 52, the corrugated portion 54 is not defined by helical or spiral corrugations continuous in a longitudinal direction of the third hose 52 but annular individual corrugations That is, in the corrugated portion 54 of the third hose 52, adjacent corrugation hills 60 and adjacent corrugation valleys 62 are discontinuous and separate each other. And, as shown in the fragmentary enlarged view of FIG. 10, a rigid metal (or resin) arresting ring 64 is fitted on the inner rubber layer 16 or an outer surface of the inner rubber layer 16 at each corrugation valley 62 via the pressure resistant reinforcement layer 56 or from an outer side of the pressure resistant reinforcement layer 56 in fit-on relation. Each of corrugation valleys 62 is arrested and restrained against motion in diametrically enlarging direction by each arresting ring 64. Namely, the corrugation valleys 62 of the inner rubber layer 16 are restrained from being diametrically enlarged by the arresting rings 64. The corrugated portion 12 of the first hose 10 and the second hose 30 can be formed from helical or spiral corrugations under the circumstances.

In this embodiment, the arresting ring 64 is formed in a complete annular shape corresponding to a circular shape of the outer peripheral surface of each separate corrugation valley 62, for example, having an inner diameter generally equal to an outer diameter of the outer peripheral surface of each separate corrugation valley 62 (outer peripheral surface of the pressure resistant reinforcement layer 56 or of the inner rubber layer 16). The arresting rings 64 fitted in the adjacent corrugation valleys 62 are discontinuous in separate relation with one another. That means, separate arresting ring 64 is fitted in each of corrugation valleys 62.

The arresting ring 64 may have a cutaway at one circumferential portion. Thus configured arresting ring 64 is fitted from the outer side of the pressure resistant reinforcement layer 56 on the outer side of the corrugated valley 62 of the inner rubber layer 16 (pressure resistant reinforcement layer 56), the cutaway is closed by welding opposite ends of the arresting ring 64 each other to form it in complete annular or ring shape, and thereby the arresting ring 64 is in fit-on relation with the outer side of the corrugation valley 62. For example, the arresting ring 64 having an opening by cutting one circumferential portion thereof and widening the cutaway is fitted on the outer side of the corrugation valley 62, and the cutaway is closed so that circumferential opposite ends are in contact relation by deforming the arresting ring 64 so as to be crashed, and welded together. Or, the arresting ring 64 may be formed originally in complete annular shape without the cutaway or the opening. In this case, the arresting ring 64 is slid over and along the outer surface of the inner rubber layer 16 (the pressure resistant reinforcement layer 56) in the longitudinal direction until fitted on the outer side of the corrugation valley 62.

The arresting ring 64 may be formed from wire of circular or rectangular cross-section, for example, metal wire. In this case, for example, wire is bent round into an annular shape around the outer side of each corrugation valley 62 to form the arresting ring 64, and opposite circumferential ends of the arresting ring 64 or the wire are folded radially outwardly to form a pair of arresting pieces. And a pair of the arresting pieces are fitted with a cover which secures the arresting pieces with one another or are twisted with one another to be joined.

Preferably, such metal arresting ring 64 is made, for example, of SUS or SUP material.

Figure 10:
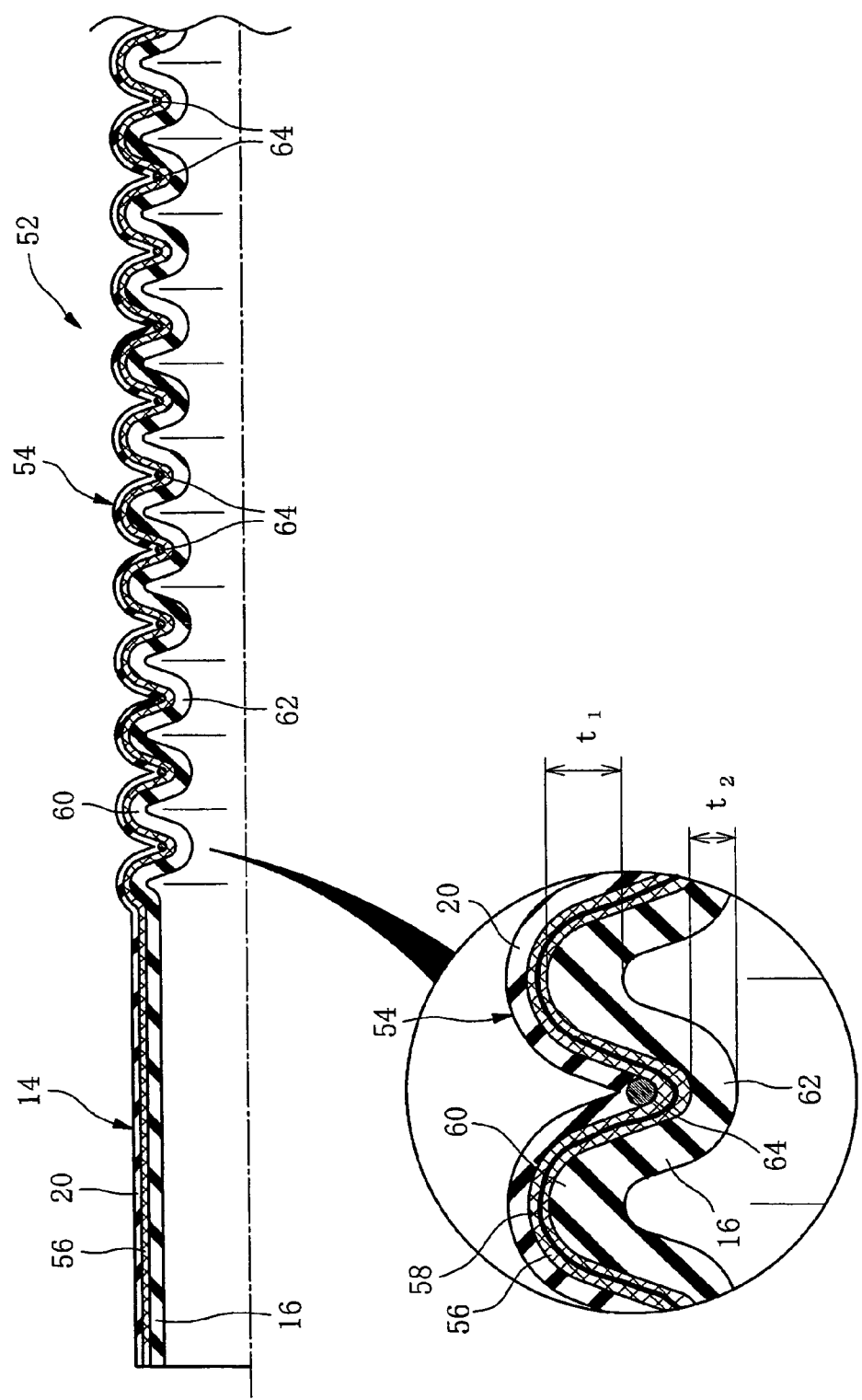
FIG. 10 is a sectional view of the third vibration absorbing hose, taken along a longitudinal direction thereof.

In the third hose 52, as shown in the fragmentary enlarged view of FIG. 10, wall thickness differs between the corrugation hills 60 and the corrugation valleys 62 in the corrugated portion 54 of the inner rubber layer 16. Namely, a wall thickness $t_1$ in the corrugation hill 60 is designed larger than a wall thickness $t_2$ in the corrugation valley 62 with respect to the inner rubber layer 16.

Figure 9:
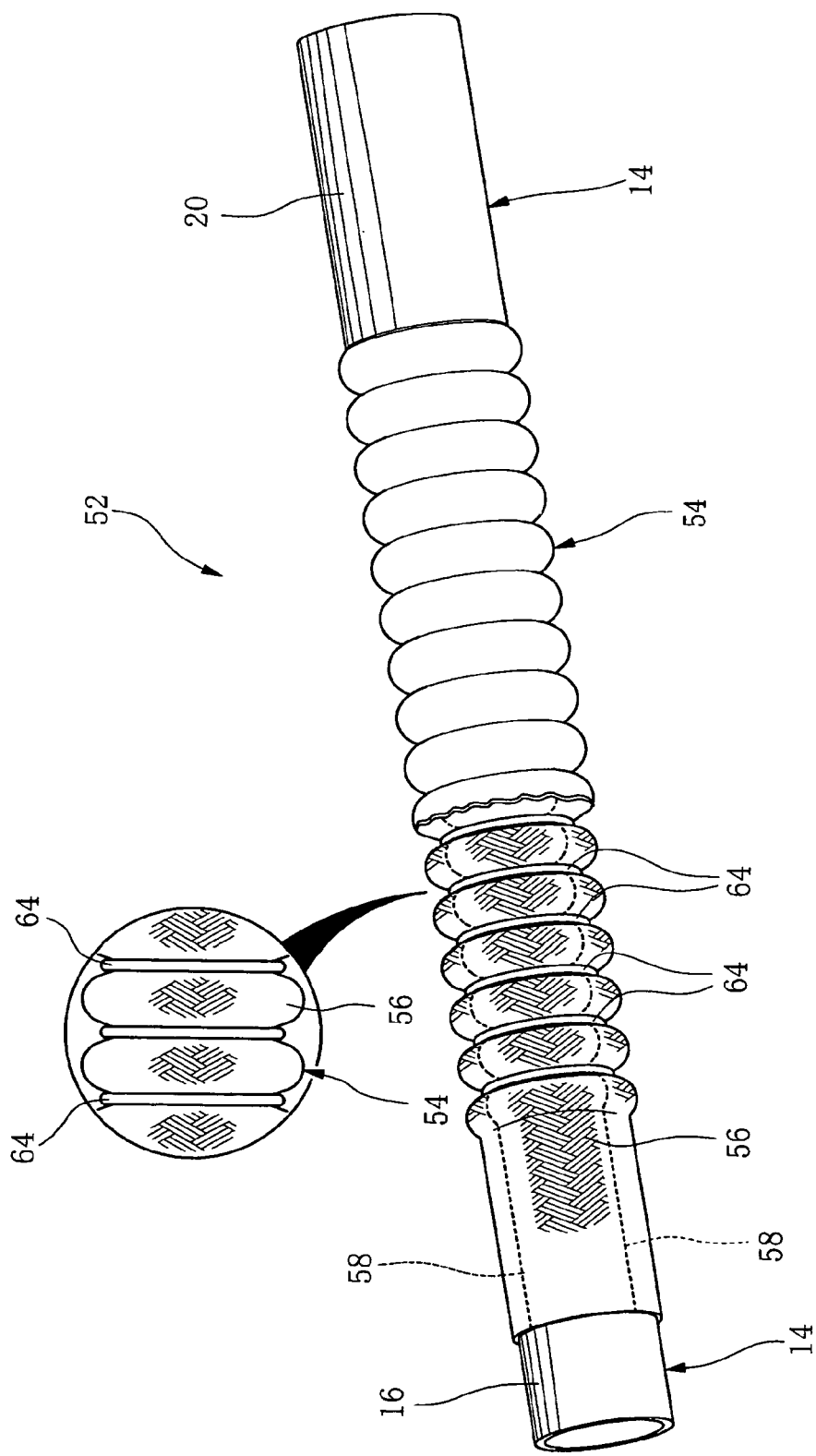
FIG. 9 is a partly cutaway perspective view of a third vibration absorbing hose according to the present invention.
Figure 11:
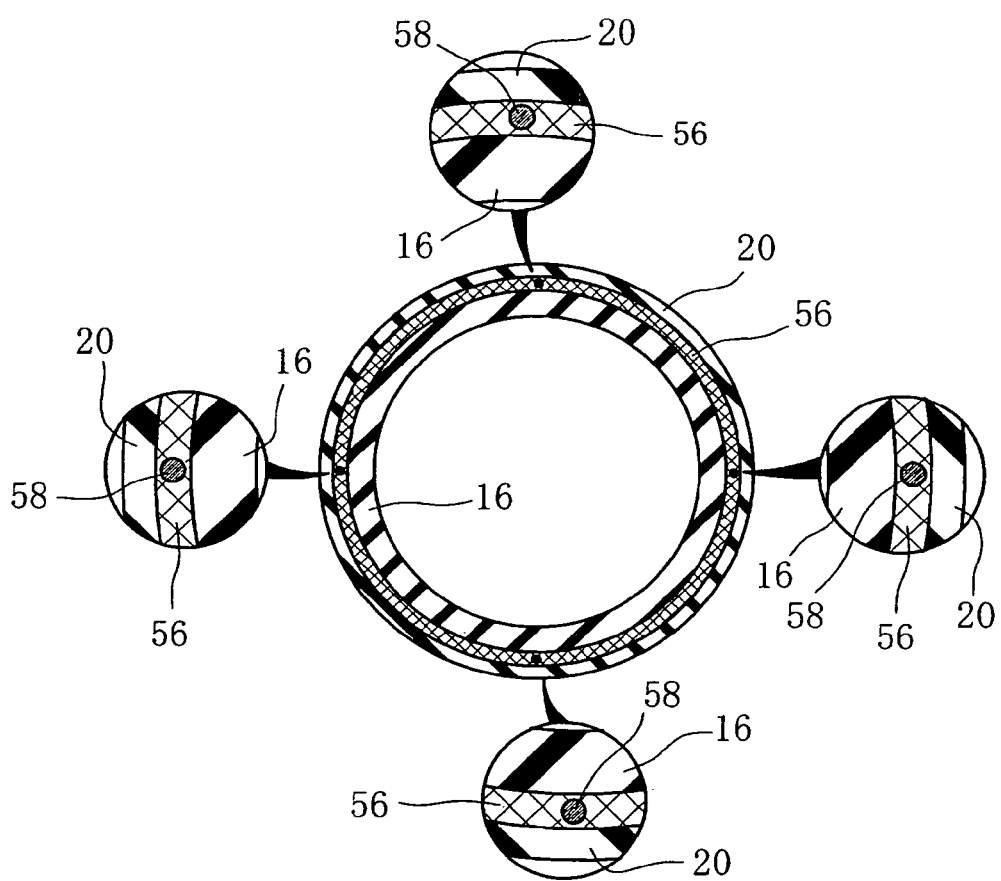
FIG. 11 is a sectional view of the third vibration absorbing hose, taken along a radial direction thereof.

The third hose 52 as shown in FIGS. 9, 10 and 11 may be manufactured, for example, in the following manner. First, the inner rubber layer 16 including corrugated portion (annularly corrugated portion) is formed by injection molding, blow molding or the like.

Likewise in manufacturing the first hose 10, the reinforcing yarns 22 are braided on the outer surface of the inner rubber layer 16 with the braiding machine 24.

During braiding procedure, longitudinally oriented reinforcement yarns 58 are also interlaced in combination with the reinforcing yarns 22 or arranged in the reinforcing yarns 22 at four circumferential positions with the braiding machine 24.

After the inner rubber layer 16 is laminated with the pressure resistant reinforcement layer 56 by braiding the reinforcing yarns 22 in combination with the longitudinally oriented reinforcement yarns 58 on the outer surface thereof as stated above, the arresting rings 64 are fitted from the outer side of the pressure resistant reinforcement layer 56 in each of corrugation valleys 62. Then inner rubber layer 16, on which the arresting rings 64 are completely fitted, is dipped into a liquid compound for the outer rubber layer 20 subsequently to be coated with the outer rubber layer 20 on the outer side of the pressure resistant reinforcement layer 56, and is put into a dry kiln for drying.

After dried, likewise in the first hose 10, the mandrel 23 is removed and a multi-layered hose product, for example, an elongated multi-layered hose product is obtained. Then, for example, the hose product is cut into desired length and thereby the third hose 52 shown in FIGS. 9, 10 and 11 is obtained. This is one example of production methods of the third hose 52. The third hose 52 may be produced in any other methods.

The third hose 52 according to the present invention may achieve the same or substantially the same effects as the first hose 10. Additionally, as the pressure resistant reinforcement layer 56 is formed including the longitudinally oriented reinforcement yarns 58, the third hose 52 may be effectively restrained from being elongated and deformed in the longitudinal direction when internal pressure is exerted thereto. This may solve the problem that the third hose 52 is elongated in the longitudinal direction to interfere with other peripheral parts and components.

Furthermore, as the longitudinally oriented reinforcement yarns 58 are interlaced in combination with reinforcing yarns 22 during braiding, the longitudinally oriented reinforcement yarns 58 and the reinforcing yarns 22 restrain each other, and thereby the pressure resistant reinforcement layer 56 may effectively restrain the corrugated portion 54, namely the third hose 52 entirely from being elongated or deformed.

And, in the third hose 52, as the rigid arresting rings 64 are fitted in the corrugation valleys 62 of the corrugated portion 54 from the outer side of the pressure resistant reinforcement layer 56 to arrest the corrugation valleys 62 against motion in diametrically enlarging direction, the corrugated portion 54 may be further favorably restrained from being elongated and deformed when internal pressure is exerted thereto. And as load on the corrugated portion 54 may be shared by the arresting rings 64 and the pressure resistant reinforcement layer 56 when internal pressure is exerted, there is additional effect that the third hose 52 may be provided with much higher pressure resistance.

Moreover, in the third hose 52, as the wall thickness $t_1$ in the corrugation hills 60 of the corrugated portion 54 in the inner rubber layer 16 is designed larger than the wall thickness $t_2$ of the corrugation valleys 62, deformation resistant property becomes large or high in the corrugation hills 60. Therefore, cooperating with deformation resistance of the corrugation hills 60 and acts of the arresting rings 64, the corrugated portion 54 is more effectively restrained from being elongated and deformed when internal pressure is exerted as shown in FIG. 12.

Figure 12:
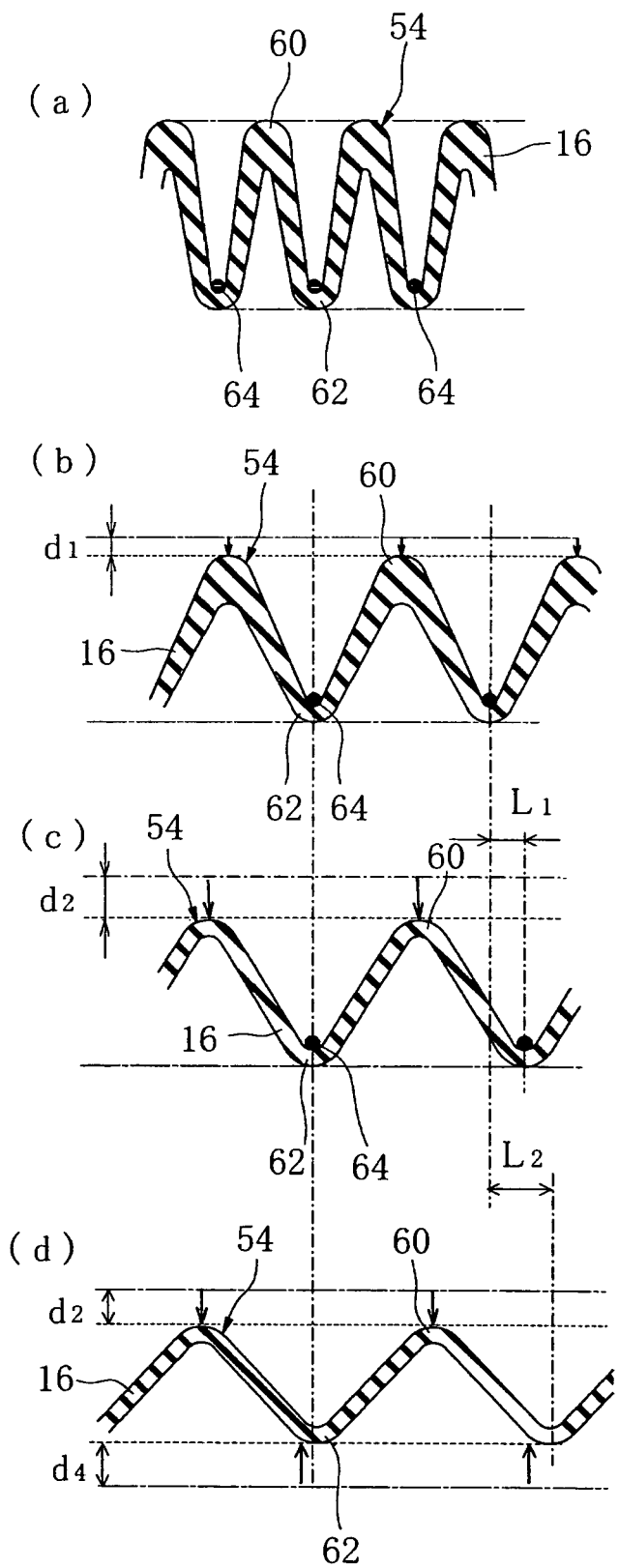
FIG. 12(a) is a view showing a state of a corrugated portion of the third vibration absorbing hose which is not elongated and deformed
FIG. 12(b) is a view showing a state of the corrugated portion of the third vibration absorbing hose which is elongated and deformed due to internal pressure.
FIG. 12(c) is a view showing a state of a corrugated portion of a comparative example which is elongated and deformed due to internal pressure.
FIG. 12(d) is a view showing a state of a corrugated portion of another comparative example which is elongated and deformed due to internal pressure.

FIG. 12($a$) shows the corrugated portion 54 of the third hose 52 which is not elongated and deformed, and FIG. 12($b$) shows the corrugated portion 54 which is elongated and deformed to some extent due to internal pressure. FIGS.

12(c) and 12(d) show corrugated portions of comparative examples to which internal pressure is exerted. FIG. 12(c) shows the corrugated portion wherein the wall thickness $t_1$ of the corrugation hill 60 is designed equal to the wall thickness $t_2$ of the corrugation valley 62. FIG. 12(d) shows the corrugated portion wherein the wall thickness $t_1$ of the corrugation hill 60 is designed equal to the wall thickness $t_2$ of the corrugation valley 62 but arresting ring 64 is not provided.

As shown in FIG. 12, by providing the arresting ring 64, the corrugated portion may be effectively restrained from being elongated and deformed. In addition, the wall thickness $t_1$ of the corrugation hill 60 designed larger than the wall thickness $t_2$ of the corrugation valley 62 may restrain the corrugated portion 54 from being elongated and deformed in a longitudinal direction of the third hose 52. More specifically, in FIG. 12(b), an outer diameter of the third hose 52 or the corrugation hills 60 is decreased by $d_1$ due to act of inner pressure. However, as deformation resistance of the corrugated portion 54 is large in the corrugation hills 60 compared to the comparative example in FIG. 12(c), $d_1$ is smaller than $d_2$ which indicates a decrement in outer diameter of the comparative example in FIG. 12(c). So, elongation and deformation of the corrugated portion 54 in FIG. 12(b) is smaller than that of the comparative example in FIG. 12(c) by $L_1$. In the comparative example in FIG. 12(d), the wall thickness $t_1$ of the corrugation hill 60 is designed equal to the wall thickness $t_2$ of the corrugation valley 62 but the arresting ring 64 is not provided. Therefore, in the comparative example of FIG. 12(d), the corrugation hills 60 are contracted radially inwardly by $d_3$ and the corrugation valleys 62 are expanding radially outwardly by $d_4$ due to act of internal pressure. And, established are formulas of $d_3+d_4>d_2$ and $L_2>L_1$, therefore elongation, deformation in FIG. 12(d) is larger than that in FIGS. 12(b) and 12(c).

EXAMPLE 3

As shown in Table 2, some hoses with various constructions are formed and the hoses are evaluated with respect to elongation rate when pressure is exerted or under pressure, bursting pressure and vibration absorbing property.

TABLE 2

| | | Example 3 | | |
|---|---|---|---|---|
| | | A | B | C |
| Shape Dimension | Inner diameter (mm) | Corrugated ø9.0 (valley) | Corrugated ø9.0 (valley) | Corrugated ø9.0 (valley) |
| | Outer diameter (mm) | ø20.0 (hill) | ø20.0 (hill) | ø20.0 (hill) |
| Inner rubber layer | Material | IIR | IIR | IIR |
| | Wall thickness of corrugation hill (mm) | 1.0 | 1.0 | 1.0 |
| | Wall thickness of corrugation valley (mm) | 1.0 | 1.0 | 1.0 |
| Reinforcement layer | Material | PET | PET | PET |
| | Denier (de) | 1000 | 1000 | 1000 |
| | No. of yarns | 3 yarns × 48 carriers | 3 yarns × 48 carriers | 3 yarns × 48 carriers |
| | Construction | Braided | Braided | Braided |
| Warp yarn | Material | PET | Aramid | — |
| | No. of yarns | 4 yarns | 4 yarns | — |
| Arresting ring | Material | — | — | SUP |
| | Wall thickness (wire diameter) (mm) | — | — | ø0.9 |
| Outer rubber layer | Material | Silicon type | Silicon type | Silicon type |
| | Wall thickness (mm) | 0.5 | 0.5 | 0.5 |
| Elongation rate under pressure (%) | | 14.1 | 10.7 | 5.4 |
| Internal pressure: 1.5 MPa | | | | |
| Bursting pressure (Mpa) | | 17.9 | 18.2 | 18.6 |

| | | Example 3 | | Comparison Example |
|---|---|---|---|---|
| | | D | E | D |
| Shape Dimension | Inner diameter (mm) | Corrugated ø9.0 (valley) | Corrugated ø9.0 (valley) | Corrugated ø9.0 (valley) |
| | Outer diameter (mm) | ø20.0 (hill) | ø20.0 (hill) | ø20.0 (hill) |
| Inner rubber layer | Material | IIR | IIR | IIR |
| | Wall thickness of corrugation hill (mm) | 1.0 | 1.5 | 1.0 |
| | Wall thickness of corrugation valley (mm) | 1.0 | 1.0 | 1.0 |
| Reinforcement layer | Material | PET | PET | PET |
| | Denier (de) | 1000 | 1000 | 1000 |
| | No. of yarns | 3 yarns×48 carriers | 3 yarns×48 carriers | 3 yarns×48 carriers |
| | Construction | Braided | Braided | Braided |
| Warp yarn | Material | PET | PET | — |
| | No. of yarns | 4 yarns | 4 yarns | — |
| Arresting ring | Material | SUP | — | — |
| | Wall thickness (wire diameter) (mm) | ø0.9 | — | — |
| Outer rubber layer | Material | Silicon type | Silicon type | Silicon type |
| | Wall thickness (mm) | 0.5 | 0.5 | 0.5 |
| Elongation rate under pressure (%) | | 3.9 | 11.8 | 22.3 |
| Internal pressure: 1.5 MPa | | | | |
| Bursting pressure (MPa) | | 18.6 | 18.2 | 17.9 |

In Table 2, in case that an initial length a of the corrugated portion (approximately 100 mm) is changed into a length β of the corrugated portion after internal pressure is exerted at 1.5 MPa for one minute, the elongation rate under pressure is indicated by calculation formula (β−a)×100/a. Here, the smaller elongation rate is the more favorable, but in view of possible interference with peripheral parts and components, the elongation rate of 20% or under is acceptable. In Table 2, descriptions in the line of "No. of yarns" are, for example, specified likewise in Table 1. And, "warp yarn" of Example 3 corresponds, for example, to the longitudinally oriented reinforcement yarn 58. Further, "reinforcement layer" of Example 3 corresponds, for example, to the pressure resistant reinforcement layer 56.

Likewise in Examples 1 and 2, bursting pressure indicates pressure value which causes a hose to burst when internal water pressure is exerted to the hose while raising the internal pressure by 160 Mpa/minute.

The vibration absorbing property is evaluated by means of a measuring equipment 42 in the same manner as in Examples 1 and 2.

Measurement conditions are as follows (the same as in Examples 1 and 2).

[Vibration Absorbing Property]

Vibration absorbing property is evaluated when internal pressure is exerted at 1.5 MPa to some hoses. When internal pressure is exerted, each hose is elongated and its length varies among hoses. Therefore, the hoses are adjusted in length respectively before exerting internal pressure thereto so as to have substantially equal length when exerting (internal) pressure thereto. After that, each hose is evaluated with respect to vibration absorbing property.

Hose configuration : straight

Frequency: 40 Hz to 1000 Hz

Acceleration : 3G constant

Figure 13:
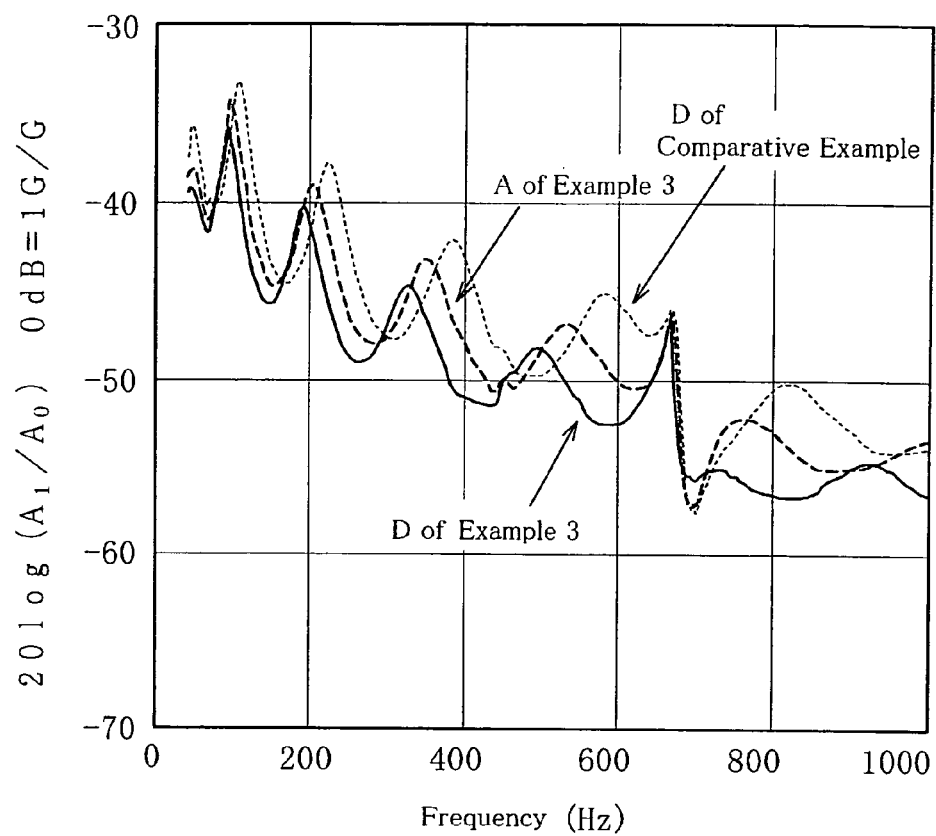
FIG. 13 is a graph showing vibration absorbing properties of the third vibration absorbing hose obtained by the measuring method of FIG. 7.

As shown in Table 2, all hoses A, B, C, D and E of Example 3 (the third hose 52) exhibit bursting pressure approximately 18 MPa or higher and are excellent in pressure resistance. And these hoses A, B, C, D and E of Example 3 exhibit elongation rate of maximum 20% when pressure is exerted. Further, as shown in FIG. 13, some hoses A and D of Example 3 exhibit excellent vibration absorbing property.

In the third hose 52, the arresting rings 64 may be omitted. Namely, the third hose 52 may have the pressure resistant reinforcement layer 56 without arresting rings 64 thereon. Also, the third hose 52 may be constructed to have the pressure resistant reinforcement layer 52 which is formed without including longitudinally oriented reinforcement yarns 58 and with the arresting ring 64 fitted in each corrugation valley 62. Further, in the third hose 52, outer rubber layer 20 may be omitted under the circumstances.

Figure 14:
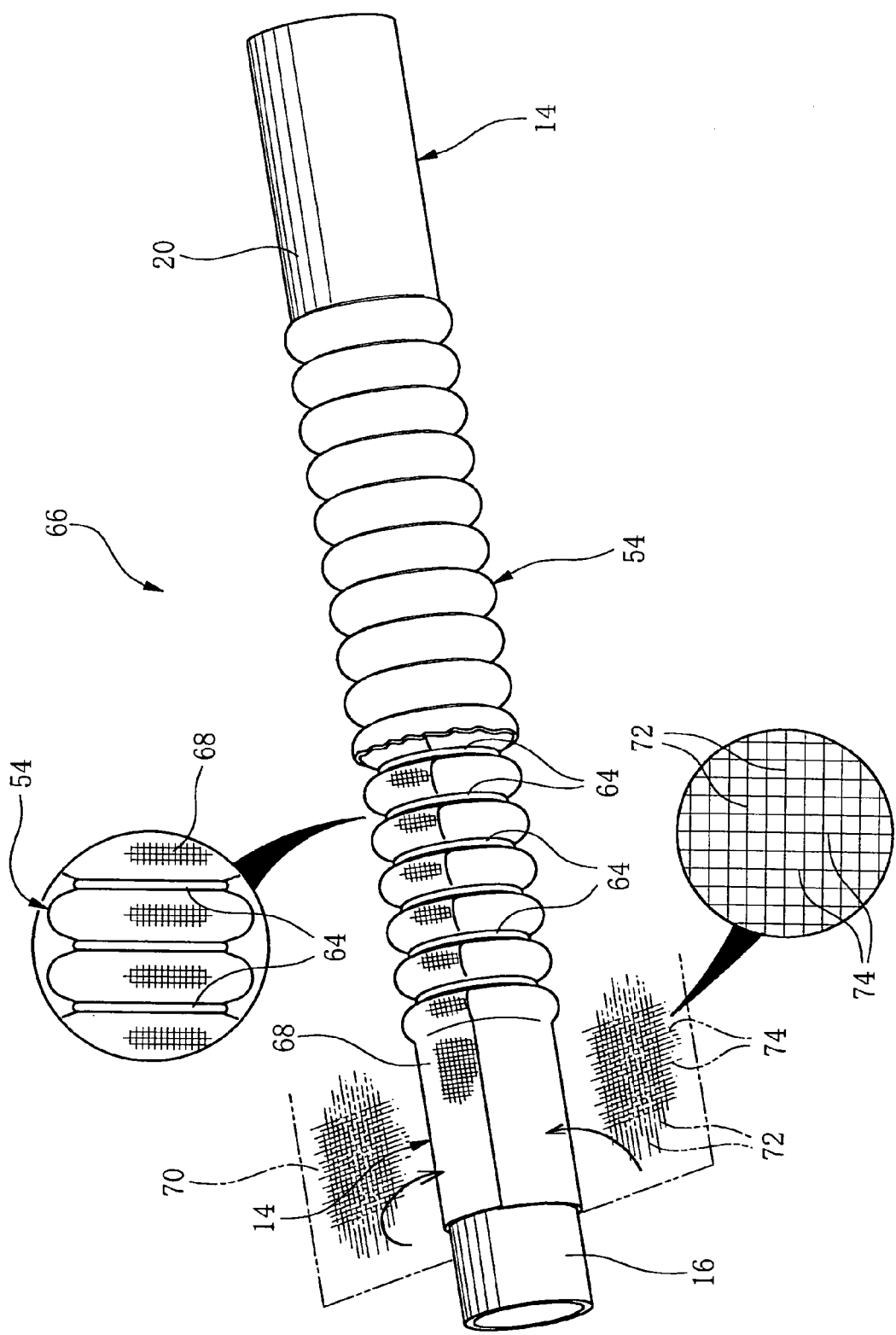
FIG. 14 is a partly cutaway perspective view of a fourth vibration absorbing hose according to the present invention along with a reinforcing fabric.
Figure 15:
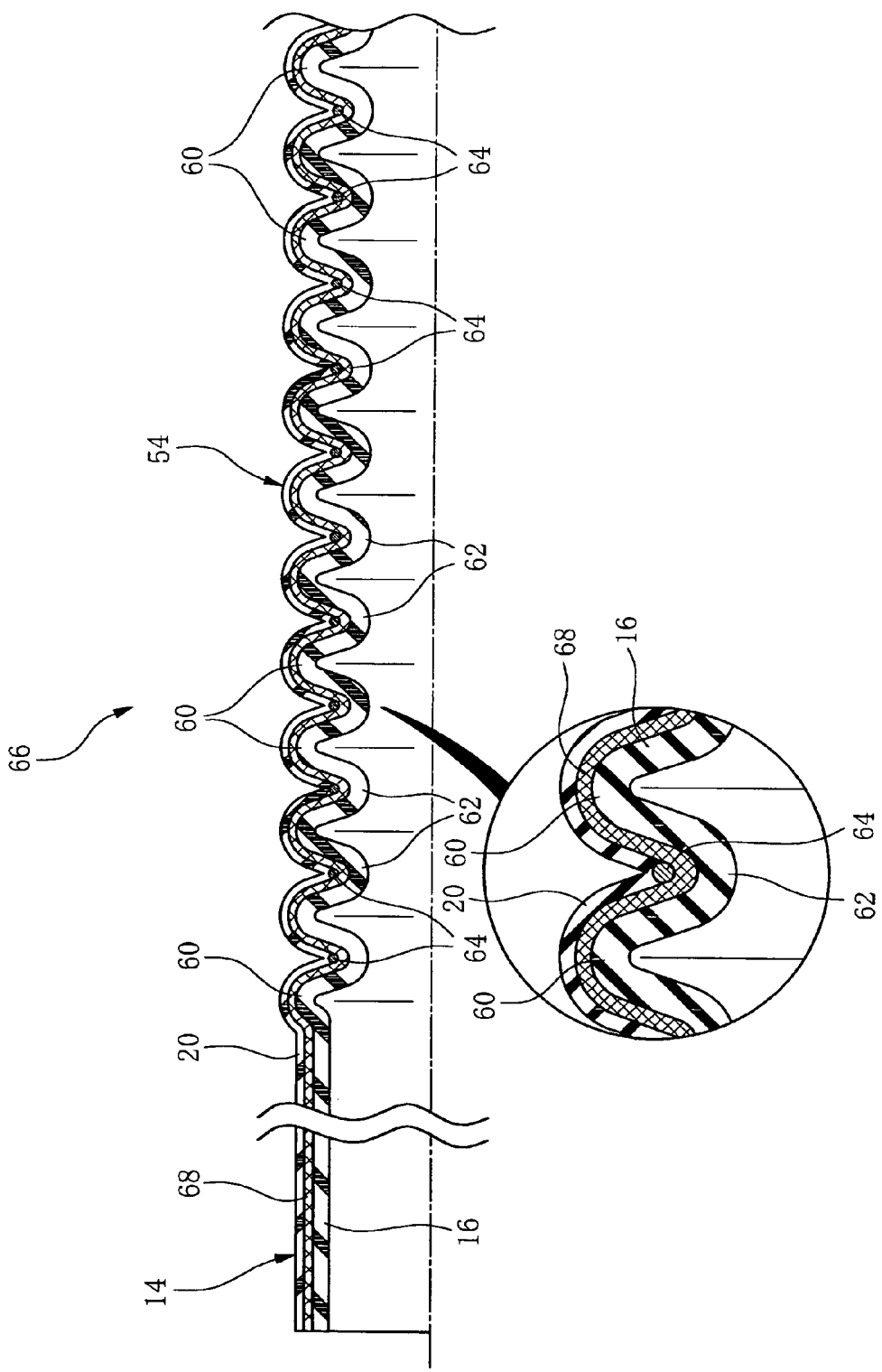
FIG. 15 is a sectional view of the fourth vibration absorbing hose.

FIGS. 14 and 15 show a fourth vibration absorbing hose 66 (hereinafter simply referred to as a fourth hose 66) according to the present invention. The fourth hose 66, which is applied, for example, as refrigerant conveying hose (air conditioning hose), is provided with pressure resistance. The fourth hose 66 is formed by modifying configuration of the pressure resistant reinforcement layer 54 of the third hose 52. Therefore, portions with configuration identical to the third hose 52 (including portions which are preferred to be given identical reference numerals to the third hose 52 for better understanding of the present invention) are roughly given identical reference numerals and explanations on them are occasionally omitted. The fourth hose 66 has a corrugated portion 54 extending relatively long or for substantially entire part of the fourth hose 66, and end portions 14, 14 of straight-sided tubular shape or straight cylindrical shape. The fourth hose 66 has multi-layered construction, tubular inner rubber layer 16, pressure resistant reinforcement layer 68 which circumscribe an outer side of the inner rubber layer 16, and outer rubber layer 20 as outermost cover layer.

In the fourth hose 66, the pressure resistant reinforcement layer 68 is constituted by arranging a reinforcing fabric 70 around the outer surface of the inner rubber layer 16 as shown in FIG. 14. The reinforcing fabric 70 is formed from warp yarns 72 and weft yarns 74 by weaving the warp yarns 72 and weft yarns 74 or by braiding the warp yarns 72 and the weft yarns 74. The warp yarns 72 and weft yarns 74, or the pressure resistant reinforcement layer 68 may be formed from the same material as the reinforcing yarns 22 and the pressure resistant reinforcement layer 56 in the third hose 52. More specifically, the reinforcing fabric 70 is wrapped or rolled up around the outer surface of the inner rubber layer 16 so that the warp yarns 72 are oriented in a longitudinal direction of the fourth hose 66 and the weft yarns 74 in a direction perpendicular to the warp yarns 72 (in circumferential direction). In other words, the reinforcing fabric 70 is applied annularly along a circumferential surface of the inner rubber layer 16 substantially without defining a helix angle.

As shown in FIG. 15, a rigid metal (or resin) arresting ring 64 is fitted on the inner rubber layer 16 or an outer surface of the inner rubber layer 16 at each corrugation valley 62 via the pressure resistant reinforcement layer 68 or from an outer side of the pressure resistant reinforcement layer 68 in fit-on relation. Each of the corrugation valleys 62 is arrested and restrained against motion in diametrically enlarging direction and reinforced by the arresting rings 64. Namely, the corrugation valleys 62 of the inner rubber layer 16 are restrained from being diametrically enlarged by the arresting rings 64. In this embodiment, the arresting ring 64 is formed in a complete annular shape corresponding to a circular shape of the outer peripheral surface of each separate corrugation valley 62. The arresting rings 64 fitted in the adjacent corrugation valleys 62 in the longitudinal direction of the fourth hose 66 are discontinuous in separate relation or in separate manner with one another. That means, separate arresting ring 64 is fitted on each of corrugation valleys 62.

Figure 16:
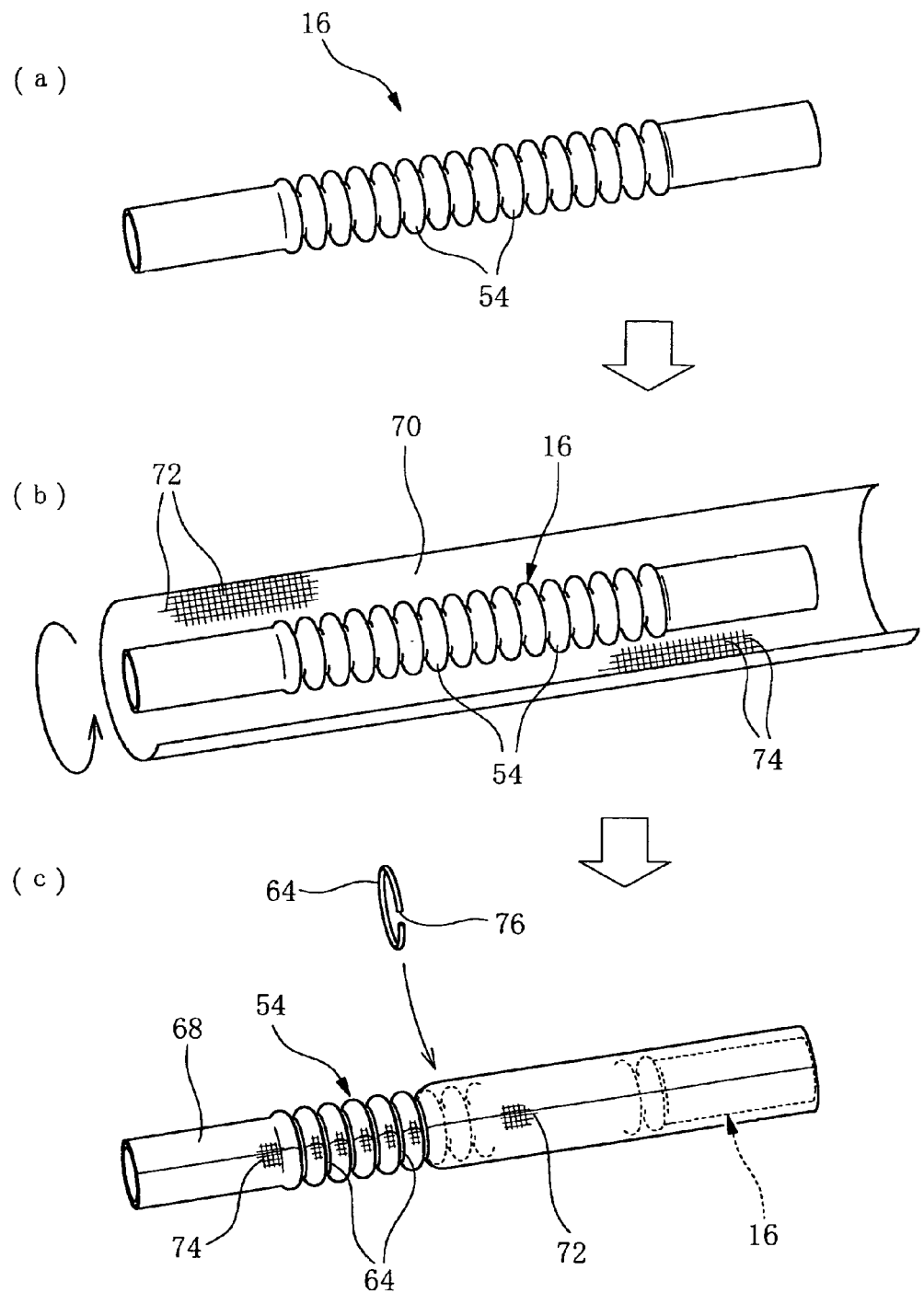
FIG. 16(a) is an explanatory view of a relevant part of production process of the fourth vibration absorbing hose, showing formation of inner rubber layer.
FIG. 16(b) is an explanatory view of a relevant part of production process of the fourth vibration absorbing hose, explaining laminating manner of pressure resistant reinforcement layer.
FIG. 16(c) is an explanatory view of a relevant part of one production process of the fourth vibration absorbing hose, showing that arresting rings are fitted thereon.

The arresting ring 64 has a cutaway 76 at one circumferential portion as shown in FIG. 16(c). Thus configured arresting ring 64 is fitted from the outer side of the pressure resistant reinforcement layer 68 in the corrugated valley 62 of the inner rubber layer 16, and then the cutaway 76 is closed by welding opposite ends of the arresting ring 64 each other to form it finally in complete annular or ring shape. For example, the arresting ring 64 is deformed in diametrically widened state at the cutaway 76, fitted in the corrugation valley 62 of the inner rubber layer 16, narrowed or returned in diametrically contracted state, and then the cutaway 76 is closed by welding.

However, just like in the third hose 52, according to the circumstances, the arresting ring 64 of the fourth hose 66 may be formed originally in complete annular shape without the cutaway 76, or may be formed from wire, for example, metal wire. Preferably, metal arresting ring 64 may be formed, for example, from SUS or SUP material. And, needless to say, the inner rubber layer 16 and the outer rubber layer 20 may be formed from the same material as in the third hose 52.

The fourth hose 66 as shown in FIGS. 14 and 15 may be manufactured, for example, as follows. First, just like the third hose 52, the inner rubber layer 16 including corrugated portion 54 is formed as shown in FIG. 16(a).

Next, as shown in FIG. 16(b), the reinforcing fabric 70 is wrapped or rolled up around an outer surface of the molded inner rubber layer 16 so that the warp yarns 72 are oriented in a longitudinal direction of the fourth hose 66 to construct the pressure resistant reinforcement layer 68. Then, as shown in FIG. 16(c), the arresting ring 64 having the cutaway 76 is fitted from the outer side of the pressure resistant reinforcement layer 68 on the inner rubber layer 16 at each corrugation valley 62 of the corrugated portion 54. Then the cutaway 76 of the arresting ring 64 fitted on is closed by welding circumferential opposite ends thereof each other.

And, the inner rubber layer 16 which is wrapped around by the reinforcing fabric 70 is fitted on with the arresting rings 64, and then is laminated with the outer rubber layer 20 as the outermost layer or the cover layer just like in the third hose 52. Then, the fourth hose 66 may be obtained.

Figure 17:
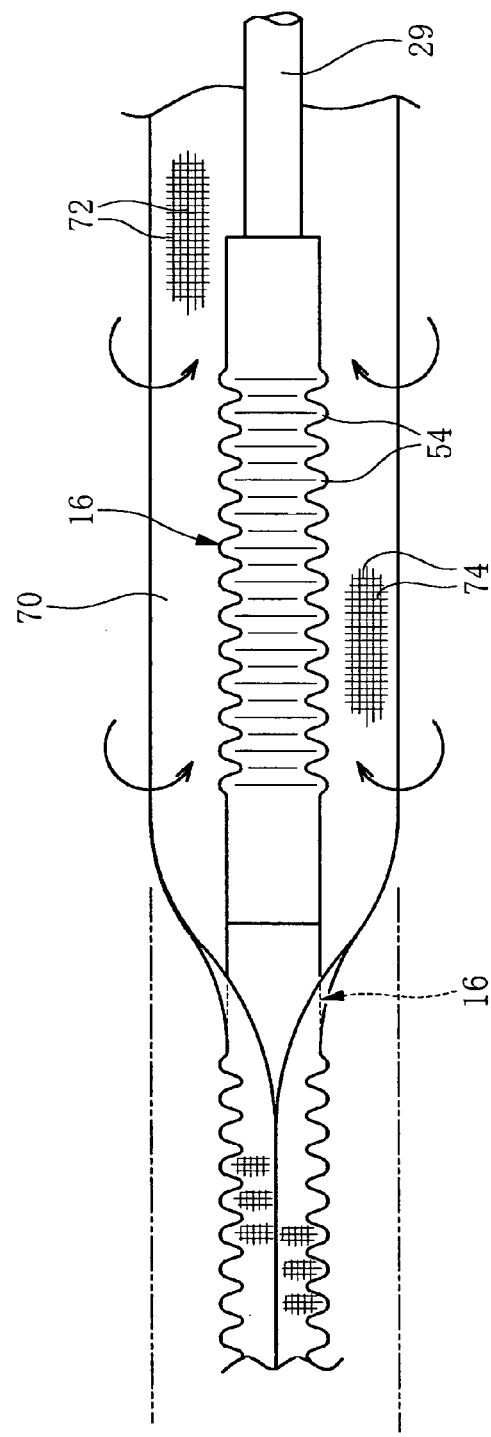
FIG. 17 is an explanatory view of a relevant part of production process different from that in FIG. 16.

Also, as shown in FIG. 17, a plurality of the molded inner rubber layer 16 may be slid over a long mandrel 29. Then, the long reinforcing fabric 70 is arranged along a length of the inner rubber layer 16 and wrapped around the outer surfaces of the inner rubber layers 16 in directions indicated by arrows in FIG. 17 to constitute the pressure resistant reinforcement layer 68. And, similarly to the above, the arresting rings 64 are fitted thereon. Then, the inner rubber layer 16 wrapped by the pressure resistant reinforcement layer 68 with the arresting rings 64 thereon is dipped into a liquid compound for the outer rubber layer 20 subsequently to be coated with the outer rubber layer 20 on the outer side thereof as outermost layer, and dried. After dried, the mandrel 29 is removed. Then, for example, an long multi-layered hose product is cut into length suitable for the fourth hose 66 and thereby the fourth hose 66 may be obtained.

The fourth hose 66 according to the present invention may achieve the same or substantially the same effects as the third hose 52. Furthermore, in this embodiment, the arresting rings 64 fitted in the corrugation valleys 62 may be adapted as securing means for the pressure resistant reinforcement layer 68. And, as the arresting rings 64 fitted on the outer side of the corrugation valleys 62 are separate each other likewise in the third hose 52, if one of them should be broken, it does not happen that restraint is lost along a certain length of the fourth hose 66 all at once due to breakage of the arresting ring 64.

In the fourth hose 66, as the pressure resistant reinforcement layer 68 is constructed by wrapping the reinforcing fabric 70 around the outer surface of the inner rubber layer 16 so that the warp yarns 72 are oriented in a longitudinal direction of the fourth hose 66, the warp yarns 72 in the reinforcing fabric 70 may restrain the fourth hose 66 favorably from being elongated and deformed in the longitudinal direction thereof On the other hand, the weft yarns 74 may restrain the fourth hose 66 favorably from expanding and deformed radially. In case of constituting the pressure resistant reinforcement layer in this manner, namely by wrapping the reinforcing fabric 70 around the inner rubber layer 16, wrapping work or reinforcement layer constituting work is favorable in view of working efficiency. Resultantly, productivity of the fourth hose 66 may be enhanced while processing cost thereof may be lowered.

EXAMPLE 4

As shown in Table 3, some hoses with various constructions are formed and the hoses are evaluated with respect to bursting pressure (pressure resistance) and vibration absorbing property.

Figure 18:
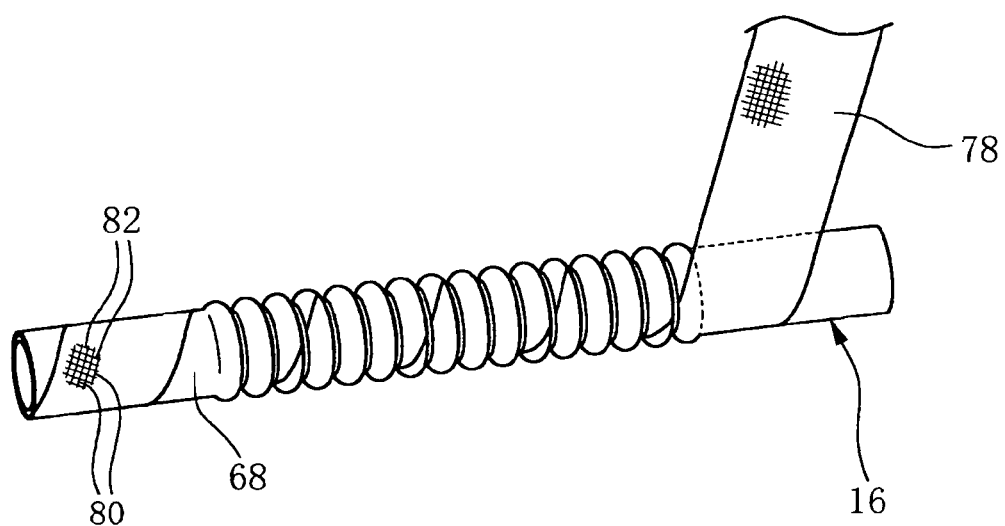
FIG. 18 is an explanatory view of a relevant part of other production process of the fourth vibration absorbing hose.

With regard to the hoses A, B, C and D of Example 4 (the fourth hose 66), in the line "laminating manner" of the reinforcement layer (the pressure resistant reinforcement layer 68), "wrapped" means that the reinforcement layer is formed by wrapping a reinforcing fabric 70 around an outer surface of the inner rubber layer 16 according to a manner shown in FIGS. 14 to 17, and "spiraled" means that the reinforcement layer is formed by winding spirally a reinforcing fabric 78 therearound so that warp yarns 80 and weft yarns 82 are oriented an inclined angle with respect to the longitudinal direction of the fourth hose 66 as shown in FIG. 18.

Likewise in Examples 1 and 2, bursting pressure indicates pressure value which causes a hose to burst when internal water pressure is exerted to the hose while raising the internal pressure by 160 Mpa/minute

TABLE 3

Figure 19:
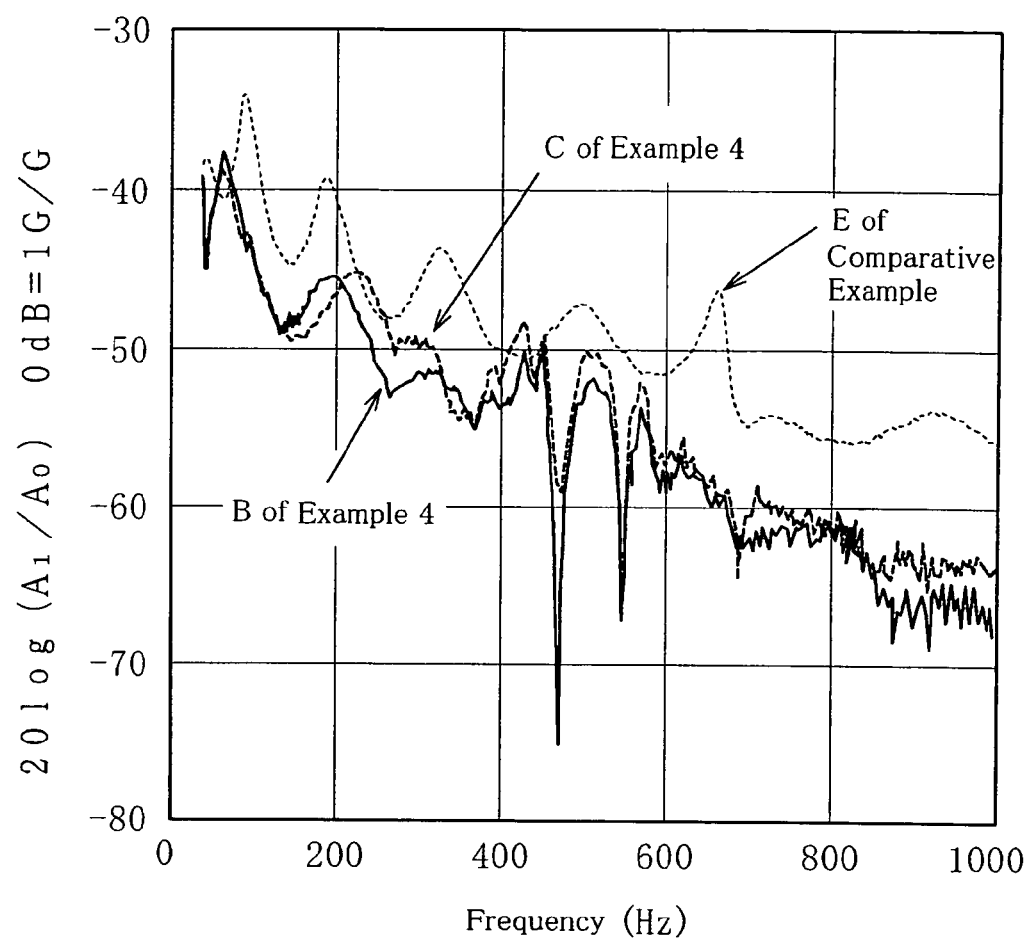
FIG. 19 is a graph showing vibration absorbing properties of the fourth vibration absorbing hose obtained by the measuring method of FIG. 7.

| | | Example 4 | | | |
|---|---|---|---|---|---|
| | | A | B | C | D |
| Shape | | Corrugated | Corrugated | Corrugated | Corrugated |
| Length of corrugated portion (mm) | | 100 | 100 | 100 | 100 |
| Hose length (mm) | | 150 *1 | 150 *1 | 150 *1 | 150 *1 |
| Dimension | Inner diameter (mm) | ø9.0 (valley) | ø9.0 (valley) | ø9.0 (valley) | ø9.0 (valley) |
| | Outer diameter (mm) | ø19.5 (hill) | ø19.5 (hill) | ø19.5 (hill) | ø19.5 (hill) |
| Inner rubber layer | Material | IIR | IIR | IIR | IIR |
| | Wall thickness (mm) | 1.0 | 1.0 | 1.0 | 1.0 |
| Reinforcement layer | Material | PA66 | PA66 | PA66 | Aramid |
| | Laminating manner | Wrapped | Wrapped | Spiraled | Wrapped |
| | Denier (de) | — | — | — | — |
| | No. of yarns | — | — | — | — |
| | Construction | — | — | — | — |
| Reinforcement ring | Material | SUS | SUP | SUP | SUP |
| | Wall thickness (wire diameter) (mm) | ø0.5 | ø0.9 | ø0.9 | ø0.9 |
| Outer rubber layer | Material | Silicon type | Silicon type | Silicon type | Silicon type |
| | Wall thickness (mm) | 0.5 | 0.5 | 0.5 | 0.5 |
| Bursting pressure(Mpa) | | 3.8 | 9.4 | 9.7 | 19.3 |
| Vibration absorbing property | | — | FIG. 19 | FIG. 19 | — |

| | | Comparative Example | | |
|---|---|---|---|---|
| | | E | F | G |
| Shape | | Cylindrical | Cylindrical | Corrugated |
| Length of corrugated portion (mm) | | — | — | 200 |

TABLE 3-continued

| Hose length (mm) | | 450 | 450 | 300 |
|---|---|---|---|---|
| Dimension | Inner diameter (mm) | ø12.0 | ø14.5 | ø25.0 (valley) |
| | Outer diameter (mm) | ø19.5 | ø22.0 | ø50.0 (hill) |
| Inner rubber layer | Material | PA6 alloy/IIR *2 | IIR | NBR |
| | Wall thickness (mm) | 0.18/1.2 | 1.7 | 3.0 |
| Reinforcement layer | Material | PET | PET | Non |
| | Laminating manner | — | — | — |
| | Denier (de) | 2000 de | 3000 de | — |
| | No. of yarns | 4 yarns × 24 carriers | 22 yarns + 22 yarns | — |
| | Construction | Braided | Spiraled | — |
| Reinforcement ring | Material | — | — | — |
| | wall thickness (wire diameter) (mm) | — | — | — |
| Outer rubber layer | Material | EPDM | EPDM | Non |
| | Wall thickness (mm) | 1.4 | 1.0 | — |
| Bursting pressure(MPa) | | 28.8 | 14.5 | 0.1 |
| Vibration absorbing property | | FIG. 19 | — | — |

Note:
*1: Opposite ends of 25 mm are portions to be clamped respectively. Therefore, substantial hose length is 100 mm.
*2: PA6 alloy - resin inner layer or resin membrane laminated in an inner surface of the inner rubber layer The vibration absorbing property is evaluated by means of a measuring equipment 42 in the same manner as in the Examples 1 and 2.

As shown in Table 3, all the hoses A, B, C and D of the Example 4 (the fourth hose 66) exhibit bursting pressure approximately 4 MPa or higher, and therefore are excellent in pressure resistance. Although these hoses A, B, C and D of Example 4 have length much shorter than the hose E of Comparative Example, some of them exhibit excellent vibration absorbing property in the graph of FIG. 19. In Table 3, descriptions in the line of "No. of yarns" are, for example, specified likewise in Table 1. And, "reinforcement layer" of Example 4 corresponds, for example, to the pressure resistant reinforcement layer 68. Further, "reinforcement ring" of Example 4 corresponds, for example, to the arresting ring 64.

In the fourth hose 66, a wall thickness of the corrugation hills 60 of the corrugated portion 54 in the inner rubber layer 16 is designed as large as that of corrugation valleys 62 thereof. However, a wall thickness of the corrugation hills 60 may be designed larger than that of the corrugation valleys 62. In the fourth hose 66 constructed with thus configured corrugation hills 60 and valleys 62, the arresting rings 64 act to restrain longitudinal elongation and deformation of the fourth hose 66 accompanied by diametrical enlargement of the corrugation valleys 62, and furthermore, deformation resistance is increased in the corrugation hills 60. So, the fourth hose 66 is effectively restrained entirely from being elongated and deformed in the longitudinal direction thereof when internal pressure is exerted thereto.

Further, in the fourth hose 66, the outer rubber layer 20 or cover layer as outermost layer may be omitted.

Figure 20:
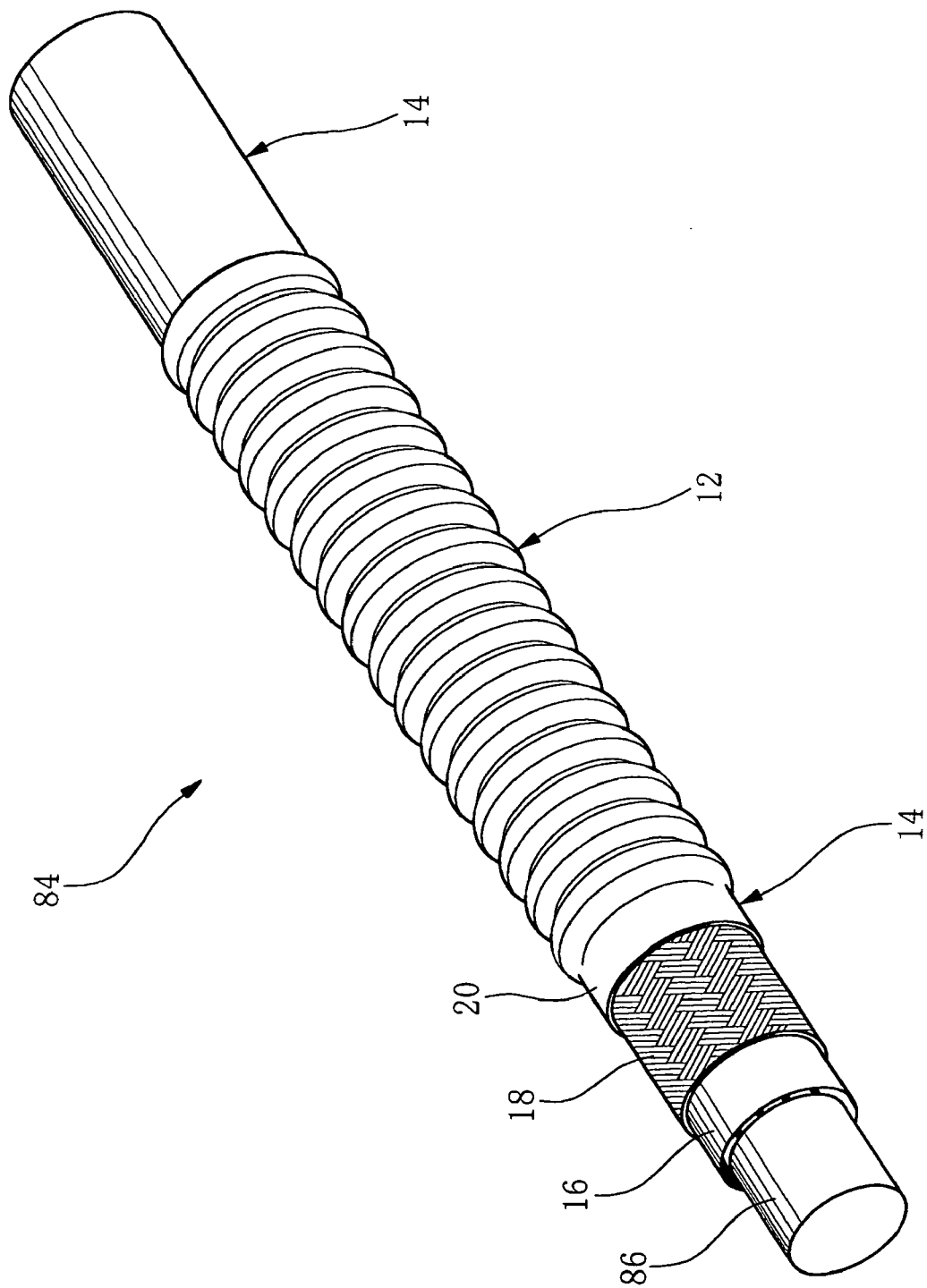
FIG. 20 is a partly cutaway perspective view of a fifth vibration absorbing hose according to the present invention.
Figure 21:
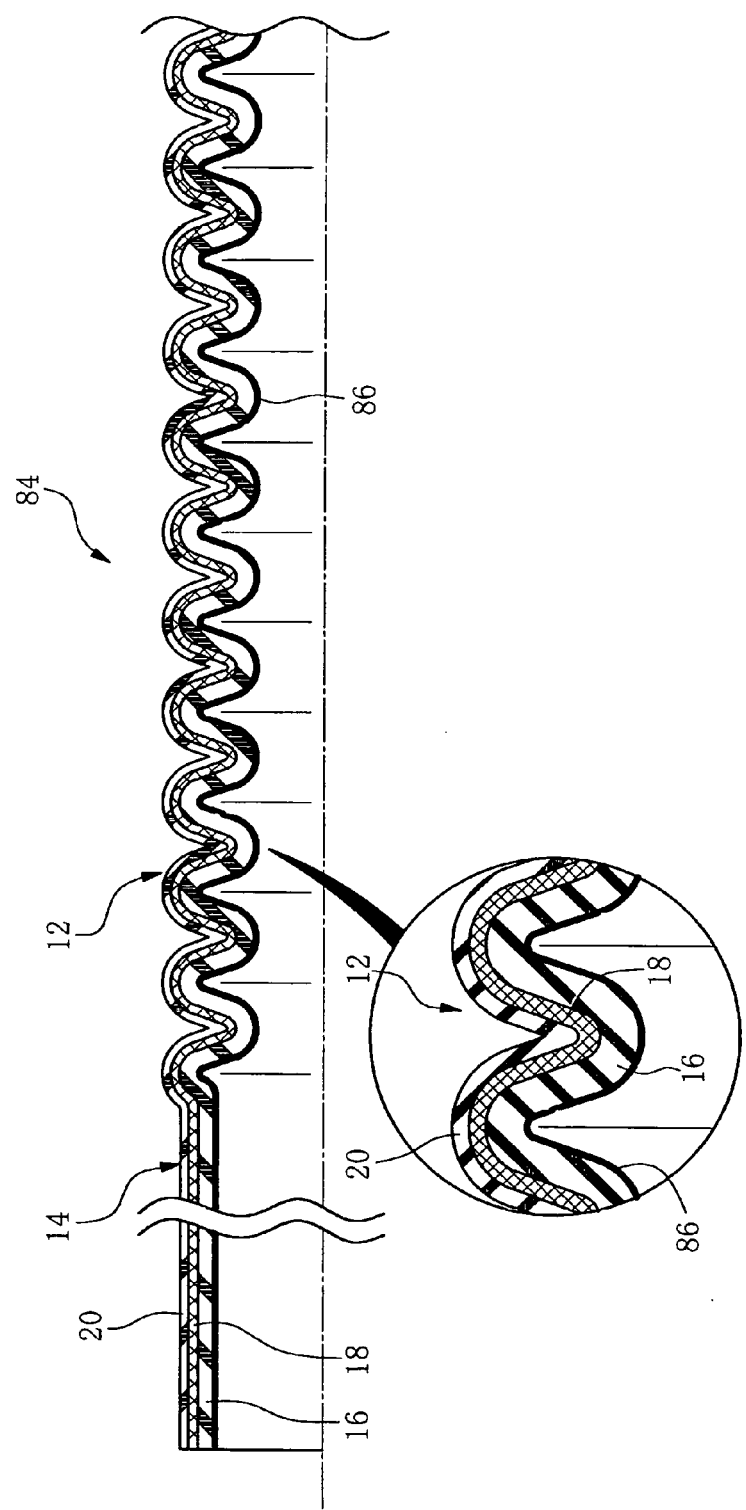
FIG. 21 is a sectional view of the fifth vibration absorbing hose, taken along a longitudinal direction thereof
Figure 22:
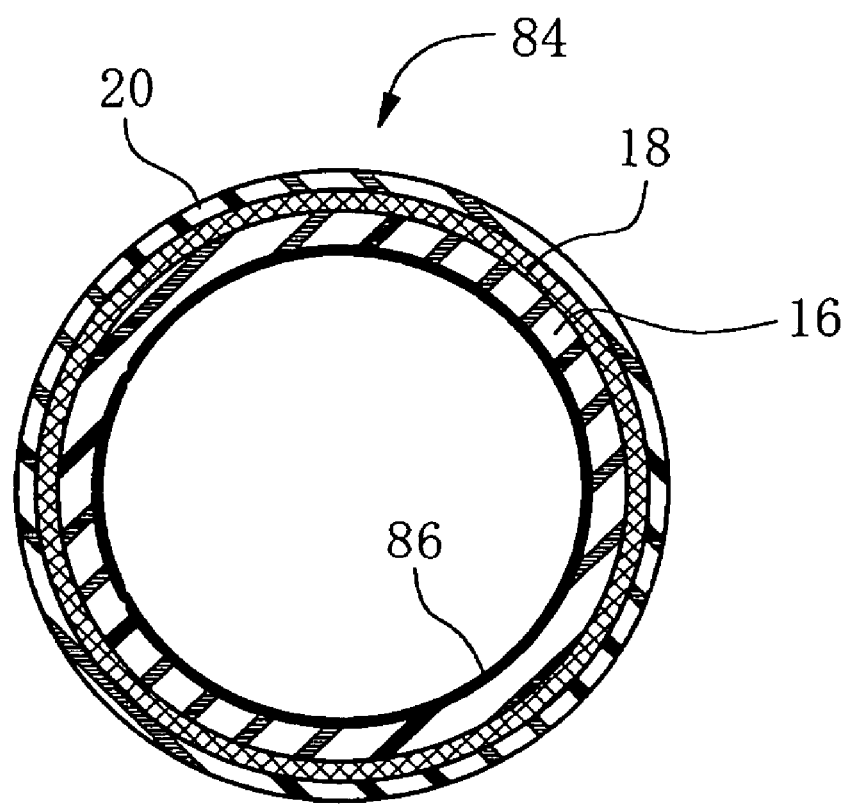
FIG. 22 is a sectional view of the fifth vibration absorbing hose, taken along a radial direction thereof

FIGS. 20, 21 and 22 show a fifth vibration absorbing hose 84 (hereinafter simply referred to as a fifth hose 84) according to the present invention. The fifth hose 84, which is applied, for example, as refrigerant conveying hose (air conditioning hose), is provided with pressure resistance. The fifth hose 84 is formed by modifying multi-layered construction of the first hose 10 to ensure gas permeation resistance. Therefore, portions with configuration identical to the first hose 10 (including portions which are preferred to be given identical reference numerals to the hose 10 for better understanding of the present invention) are roughly given identical reference numerals and explanations on them are occasionally omitted. The fifth hose 84 has a corrugated portion 12 extending relatively long or for substantially entire part of the fifth hose 84, and end portions 14, 14 of straight-sided tubular shape or straight cylindrical shape. The fifth hose 84 has multi-layered construction, tubular inner rubber layer 16, pressure resistant reinforcement layer 18 which circumscribes an outer side of the inner rubber layer 16, and outer rubber layer 20 as outermost cover layer. And, in the fifth hose 84, resin membrane or coating 86 is laminated in an inner surface of the inner rubber layer 16 by electrostatic spraying resin.

In the fifth hose 84, likewise in the first hose 10, the pressure resistant reinforcement layer 18 is formed or constructed by braiding reinforcing yarns or filament member 22 (refer to FIG. 3) over and along an outer surface of the tubular inner rubber layer 16, more specifically along straight cylindrical shape of the both end portions 14, 14 and corrugations therebetween. Therefore, the pressure resistant reinforcement layer 18 is formed in straight cylindrical shape at both end portions 14, 14 and in shape corresponding to corrugations or in corrugated shape, for example, in shape having corrugation hills and valleys in the corrugated portion 12 between the both end portions 14, 14. The pressure resistant reinforcement layer 18 is laminated on an outer side of the inner rubber layer 16 entirely in contact or close contact relation with the outer surface thereof Here, the resin membrane 86 is formed from resin powder by electrostatic coating or spraying in wall thickness or thickness of 50 μm to 250 μm. Due to this resin membrane 86 (or resin powder by electrostatic coating or spraying), the inner rubber layer 16 has volume resistivity value of maximum $1 \times 10^6$ Ω-cm.

In the fifth hose 84, needless to say, the inner rubber layer 16, the pressure resistant reinforcement layer 18, reinforcing yarns 22 of the pressure resistant reinforcement layer 18 and the outer rubber layer 20 may be formed from the same material as the first hose 10. The fifth hose 84 is designed to have an inner diameter of approximately 5 mm to 50 mm.

The fifth hose 84 as shown in FIGS. 20, 21 and 22 may be manufactured, for example, as follows. First, likewise in the first hose 10, the inner rubber layer 16 including corrugation is formed by injection molding, blow molding or the like.

Figure 23:
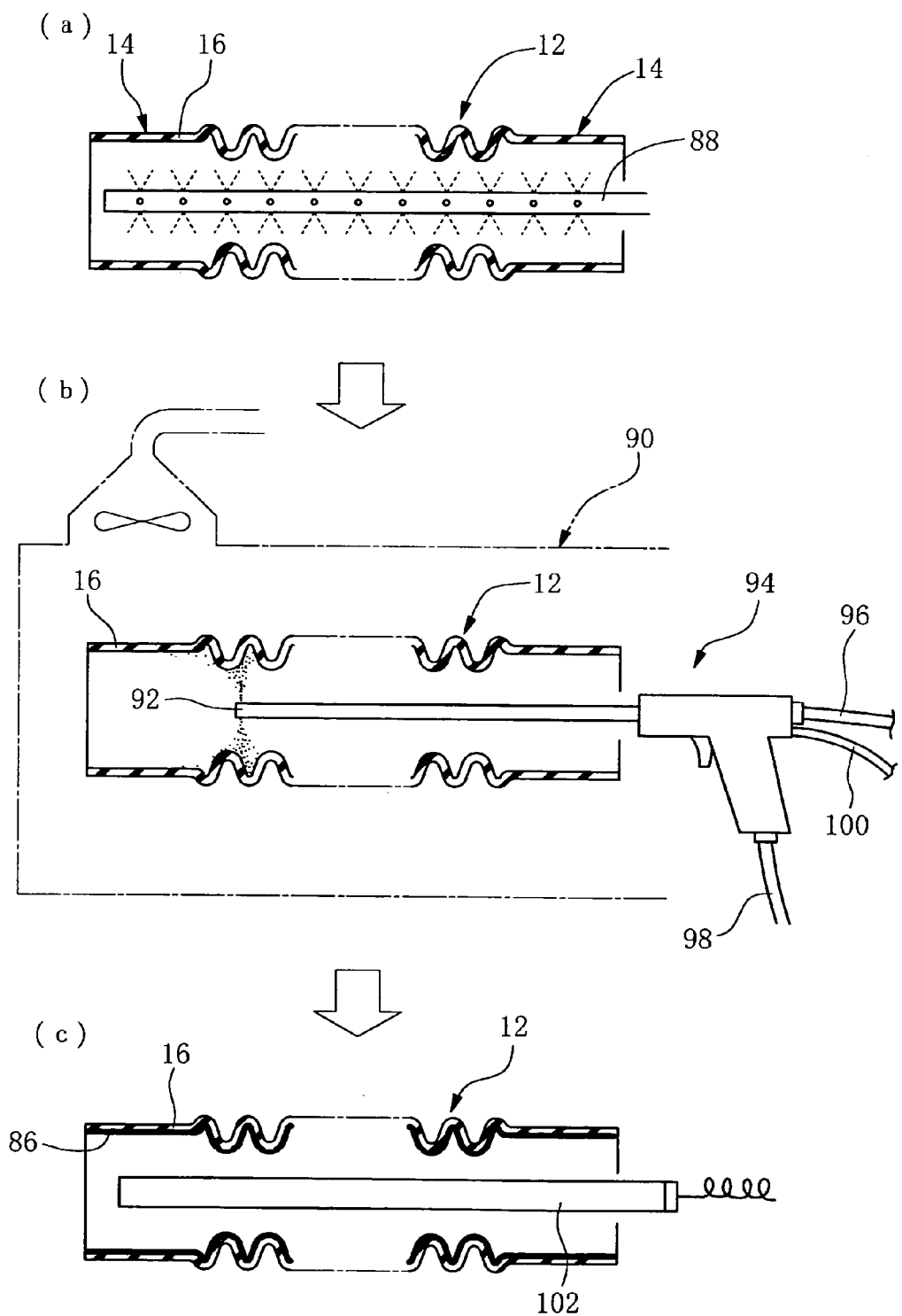
FIG. 23(a) is an explanatory view of formation method of resin membrane in the fifth vibration absorbing hose, showing that adhesive agent is applied.
FIG. 23(b) is an explanatory view of formation method of the resin membrane in the fifth vibration absorbing hose, showing that resin powder is sprayed.
FIG. 23(c) is an explanatory view of formation method of the resin membrane in the fifth vibration absorbing hose, showing that the resin membrane is laminated.

Then, adhesive agent is applied to an inner surface of the inner rubber layer 16. The adhesive agent is applied, for example, in the following manner. As shown in FIG. 23(*a*), a spray nozzle 88 is inserted in the interior of the inner rubber layer 16, and then mist of the adhesive agent is sprayed onto the inner surface of the inner rubber layer 16 through a lot of jet perforations provided on the spray nozzle 88.

After the adhesive agent applied is dried, and then resin power is electrostatic sprayed onto the inner surface of the inner rubber layer 16, for example, as follows. The inner rubber layer 16 is placed in the interior of a chamber 90 and the resin powder jets out onto the inner surface of the inner rubber layer 16 through a jet nozzle (nozzle spout) 92 on a tip end of a spray gun 94 in a direction perpendicular to an axis or in a radial direction (refer to FIG. 23(*b*)).

To the spray gun 94, a feed pipe 96 and an air pipe 98 are connected. And, the spray gun 94 is connected via a conductive wire 100 to a high-voltage generator. During electrostatic coating or spraying by the spray gun 94, the resin power supplied to the spray gun 94 is jet sprayed with air which is also supplied thereto through the jet nozzle 92 on the tip end. At this time, the resin powder is sprayed in negatively or positively charged state.

On the other hand, the inner rubber layer 16 is held by a metal plate and earthed via the metal plate. Here, high negative voltage is applied to the spray gun 94, the resin powder is thereby jet sprayed in negatively charged state. At that time, the inner rubber layer 16 acts as counter electrode (positive electrode), the negatively charged resin powder flies toward the inner rubber layer in an electrostatic field generated upon application of high negative voltage, and attached to the inner surface of the inner rubber layer 16 to form resin coating or membrane thereon.

Next, likewise in the first hose 10, the inner rubber layer 16 coated with the resin powder is taken out of the chamber 90, and heated in a heated oven or by a heater 102 such as a far infrared ray heater which is inserted in the interior of the inner rubber layer 16 to heat and melt the resin powder. Then, the resin powder is cooled and thereby the resin membrane 86 is laminated in the inner surface of the inner rubber layer 16.

After the resin membrane 86 is laminated in the inner surface of the inner rubber layer 16 in this manner, likewise in the first hose 10, the reinforcing yarns 22 are braided on the outer surface of the inner rubber layer 16 to form the pressure resistant reinforcement layer 18 thereon by means of the braiding machine 24. And, the inner rubber layer 16, which is laminated with the pressure resistant reinforcement layer 18, is then dipped into a liquid compound for the outer rubber layer 20 subsequently to be coated with the outer rubber layer 20 on the outer side thereof (of the reinforcing yarns 22), and is put into a dry kiln for drying.

After dried, likewise in the first hose 10, the mandrel 23 is removed, then, for example, a long multi-layered hose product is cut into desired length, and thereby the fifth hose 84 shown in FIGS. 20, 21 and 22 is obtained. This is one example of production methods of the fifth hose 84. The fifth hose 84 may be produced in any other methods.

The fifth hose 84 may achieve the same or substantially the same effects as the first hose 10.

In the fifth hose 84, the resin membrane 86 is laminated in the inner surface of the inner rubber layer 16 in wall thickness or thickness of 50 $\mu$m to 250 $\mu$m by electrostatic coating or spraying, and thereby gas permeation resistant property may be dramatically improved compared to the first hose 10.

EXAMPLE 5

Inner rubber layers of Example 5 (which are applied to the fifth hose 84) and Comparative Example are formed from rubber materials blended as shown in Table 4 ("rubber composition") respectively, and the resin membrane is formed in inner surfaces of the inner rubber layers from various resin materials as shown in Table 4 with various wall thickness or thickness by electrostatic coating or spraying. Then, each resin membrane 86 is evaluated with regard to coating property and permeability to freon gas.

The permeability to freon gas is evaluated by using a sheet 104 (refer to FIG. 24) which is formed from same material as the inner rubber layer by vulcanization. The results are also shown in Table 4.

TABLE 4

| | | Comparative Example | | | Example 5 | |
|---|---|---|---|---|---|---|
| | | H | I | J | A | B |
| Rubber composition | Polymer kind or type | IIR/Cl-IIR | <-- | <-- | <-- | <-- |
| | Stearic acid | 1 | <-- | <-- | <-- | <-- |
| | Zinc oxide | 5 | <-- | <-- | <-- | <-- |
| | FEF carbon black | 60 | <-- | <-- | <-- | <-- |
| | MAF carbon black | — | <-- | <-- | <-- | <-- |
| | Naphthen type oil (processed) | 5 | <-- | <-- | <-- | <-- |
| | Paraffin type oil (processed) | — | <-- | <-- | <-- | <-- |

TABLE 4-continued

|  |  |  |  |  |  |  |
|---|---|---|---|---|---|---|
| Inner rubber layer | Vulcanizing material | Resin | <-- | <-- | <-- | <-- |
|  | volume resistivity (Ω-cm) | 1.6 × 10⁴ | <-- | <-- | <-- | <-- |
| Resin membrane | Type | — | PA11 | <-- | <-- | <-- |
|  | Thickness (mm) | — | 0.04 | 0.6 | 0.05 | 0.2 |
| Rubber/ resin | Coating property | — | ○ | X | ○ | ○ |
|  | Permeation of freon (mg/cm² day) | 3.4 | 2 | 0.2 | 1.7 | 0.6 |
|  | Judgement | X | X | ○ | ○ | ○ |

|  |  | Example 5 | | | | |
|---|---|---|---|---|---|---|
|  |  | C | D | E | F | G |
| Rubber composition | Polymer kind or type | IIR/Cl-IIR | <-- | <-- | EPDM | EPM |
|  | Stearic acid | 1 | <-- | <-- | 1 | <-- |
|  | Zinc oxide | 5 | <-- | <-- | 5 | <-- |
|  | FEF carbon black | 60 | <-- | 40 | — | <-- |
|  | MAF carbon black | — | <-- | — | 90 | <-- |
|  | Naphthen type oil (processed) | 5 | <-- | <-- | — | <-- |
|  | Paraffin type oil (processed) | — | <-- | — | 60 | <-- |
|  | Vulcanizing material | Resin | <-- | <-- | S | PO |
| Inner rubber layer | volume resistivity (Ω-cm) | 1.6 × 10⁴ | <-- | 2.9 × 10⁹ | 9.6 × 10⁵ | 5.4 × 10⁵ |
| Resin membrane | Type | Fluoro-carbon resin | Pyrolytic boron nitride (PBN) | PA11 | <-- | <-- |
|  | Thickness (mm) | 0.2 | 0.2 | 0.2 | 0.2 | 0.2 |
| Rubber/ resin | Coating property | ○ | ○ | Δ | ○ | ○ |
|  | Permeation of freon (mg/cm² day) | 0.5 | 0.2 | 0.9 | 1.5 | 1.5 |
|  | Judgement | ○ | ○ | ○ | ○ | ○ |

Figure 24:
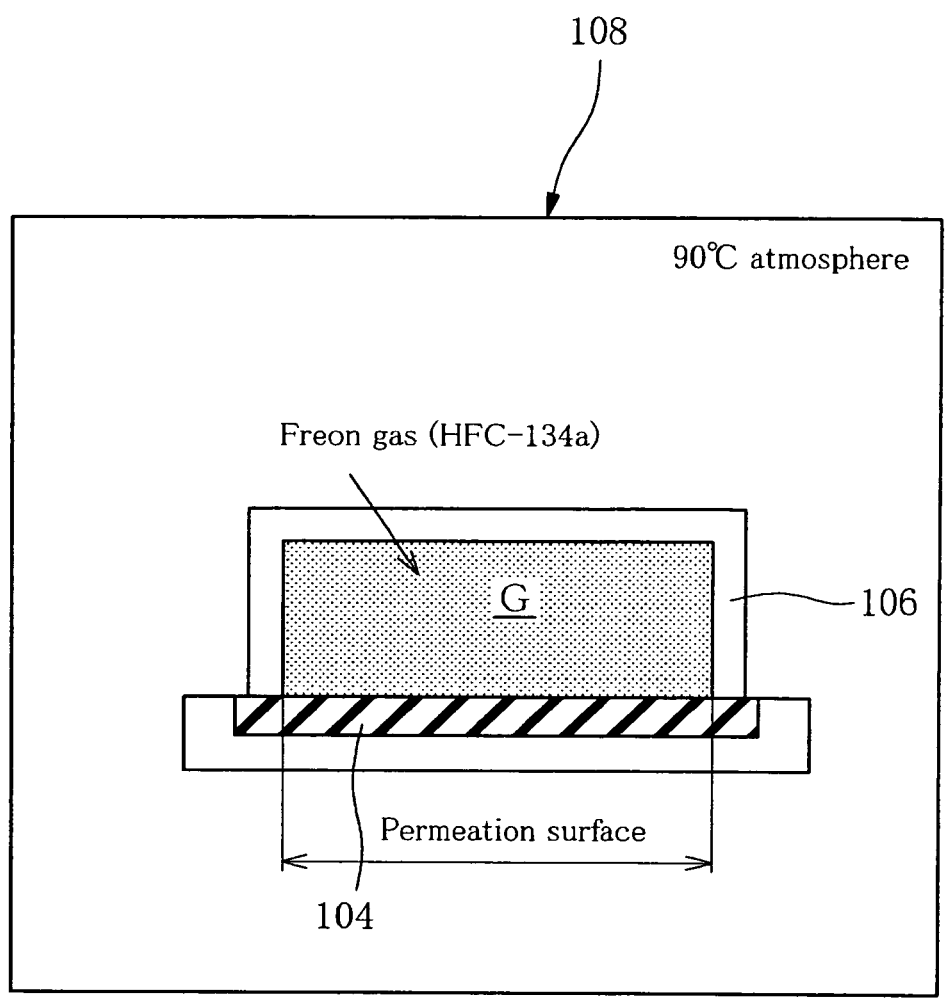
FIG. 24 is a view showing measuring method of gas permeation resistant properties of examples of the fifth vibration absorbing hose and comparative examples in order to confirm effects of the fifth vibration absorbing hose.

Here, gas permeability or gas permeation resistance is evaluated as follows. As shown in FIG. 24, a cup 106 in which freon gas (HFC-134a) is enclosed at low temperature, is closed its opening with vulcanized rubber sheet 104 and then placed in an oven 108 at 90° C. Then weight change (decreased amount) per day and per unit permeation surface area is calculated to obtain value of freon gas permeation amount.

Judgement is made based on a hose H of Comparative Example. If permeation of freon (value of freon gas permeation amount) is equal to or less than 50% (1.7 mg/cm² day) of that of the hose H of Comparative Example, judgement is indicated by a symbol "○"(good). If permeation of freon is over 50% thereof, judgement is indicated by a symbol "×"(inferior).

As for coating property with respect to resin membrane in Table 4, if coating is made in uniform wall thickness or thickness, judgement is indicated by a symbol "○"(good). If it is difficult for coating to be made in uniform wall thickness or thickness (including the case that resin powder remains on a inner surface of the inner rubber layer), judgement is indicated by a symbol "×"(inferior). In borderline case, judgment is indicated by a symbol "Δ"

Judging from the above results, it may sufficiently improve permeability resistance to freon to laminate the inner surface of the inner rubber layer with the resin membrane of thickness of 50 μm to 250 μm (specifically 50 μm to 200 μm). Therefore, the fifth hose 84 including such resin membrane 86, as shown in FIGS. 20, 21 and 22 has not only excellent permeability resistance to gas, but also favorable pressure resistance brought by the pressure resistant reinforcement layer 18 laminated on the outer surface of the inner rubber layer 16 and favorable vibration absorbing property brought by the corrugated portion 12.

Figure 25:
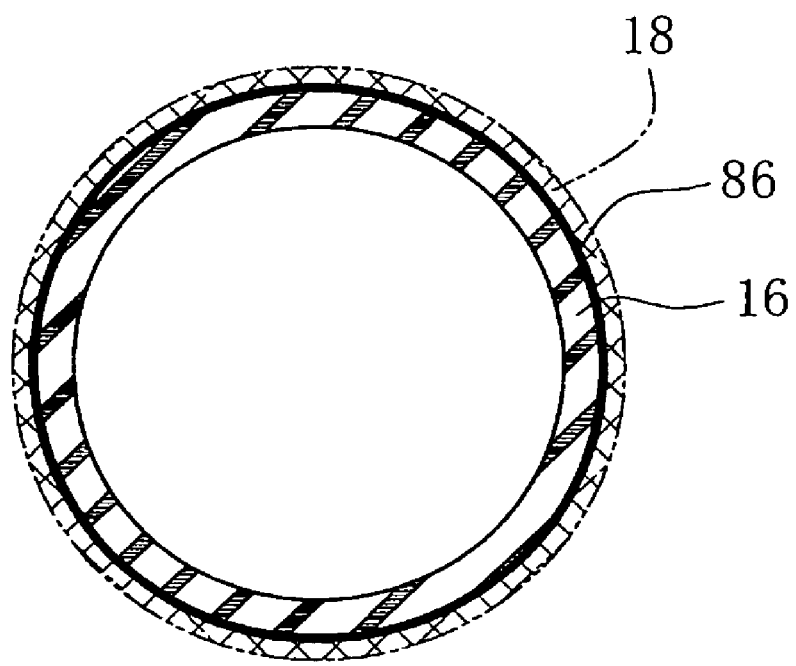
FIG. 25 is a sectional view of another embodiment of the fifth vibration absorbing hose.

In the fifth hose 84, the resin membrane 86 is laminated in the inner surface of the inner rubber layer 16. However, for example, as shown in FIG. 25, the resin membrane 86 may be laminated on an outer surface of the inner rubber layer 16, instead of in the inner surface thereof, and the pressure resistant reinforcement layer 18 may be laminated on an outer side of the resin membrane 86. Or, although the pressure resistant reinforcement layer 18 is formed by braiding reinforcing yarns 22 in the fifth hose 84, the pressure resistant reinforcement layer 18 may be formed also by winding the reinforcing yarns 22 spirally. Further, the outer rubber layer 20 or cover layer may be omitted under the circumstances.

Figure 26:
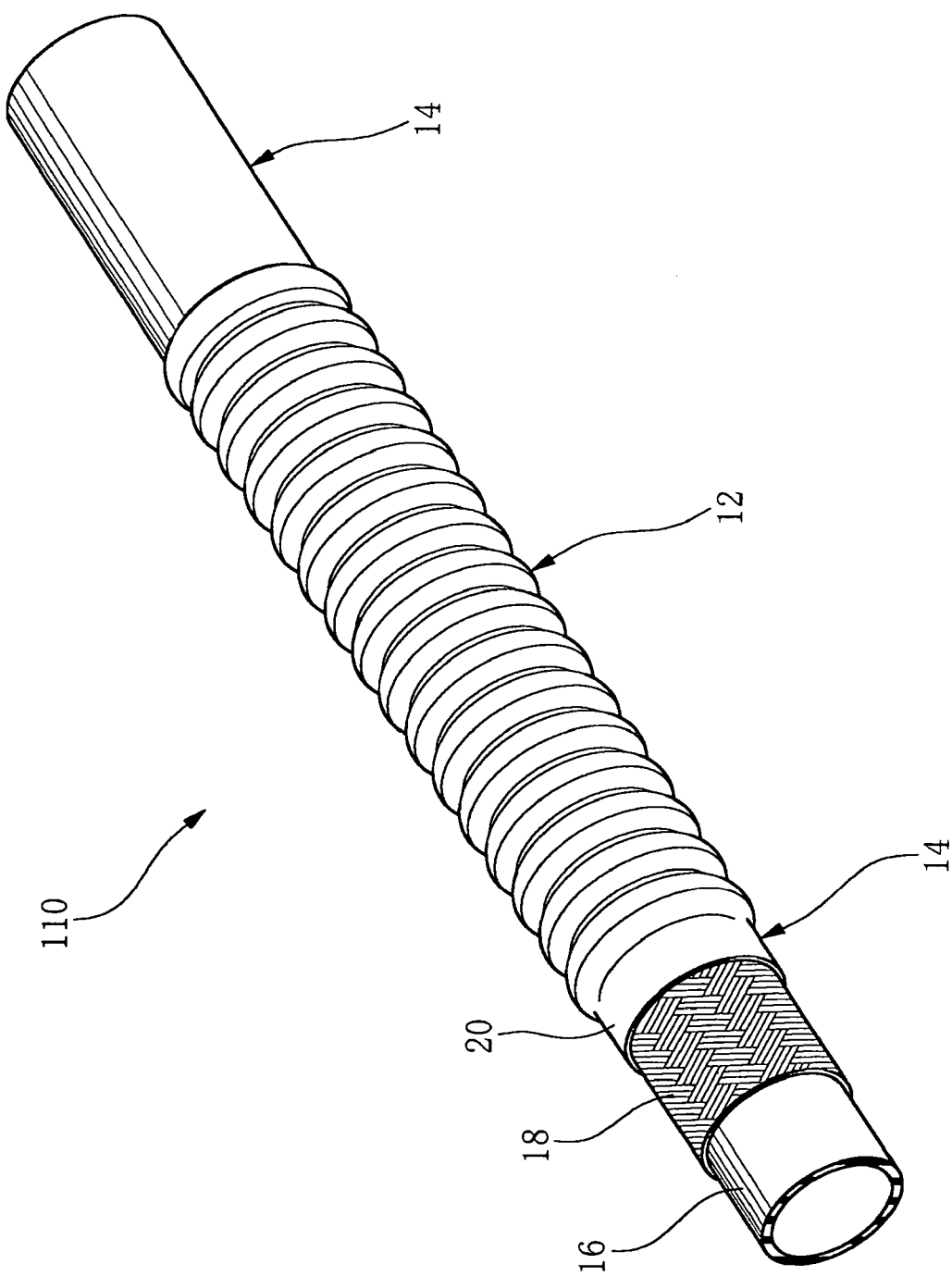
FIG. 26 is a partly cutaway perspective view of a sixth vibration absorbing hose according to the present invention.
Figure 27:
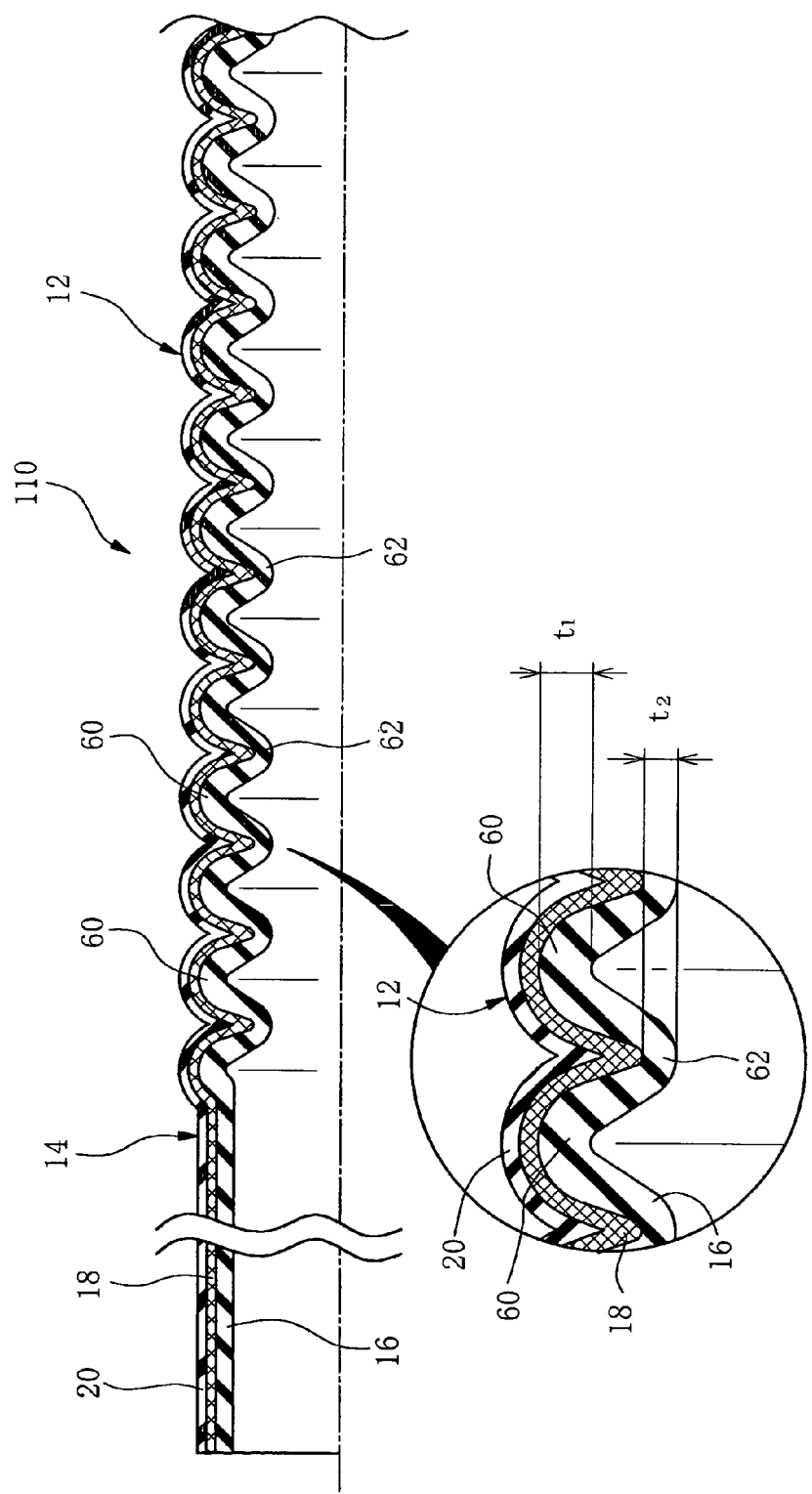
FIG. 27 is a sectional view of the sixth vibration absorbing hose.

FIGS. 26 and 27 show a sixth vibration absorbing hose 110 (hereinafter simply referred to as a sixth hose 110) according to the present invention. The sixth hose 110, which is applied, for example, as refrigerant conveying hose (air conditioning hose), is provided with pressure resistance. The sixth hose 110 is formed by modifying multi-layered construction of the first hose 10 to ensure gas permeation resistance. Therefore, portions with configuration identical to the first hose 10 (including portions which are preferred to be given identical reference numerals to the hose 10 for better understanding of the present invention) are roughly given identical reference numerals and explanations on them are occasionally omitted. The sixth hose 110 has the corrugated portion 12 extending relatively long or for substantially entire part of the sixth hose 110, and end portions 14, 14 of straight cylindrical shape. The sixth hose 110 has multi-layered construction or configuration, tubular inner rubber layer 16, pressure resistant reinforcement layer 18 which circumscribes an outer side of the inner rubber layer 16, and outer rubber layer 20 as outermost cover layer.

In the sixth hose 110, the pressure resistant reinforcement layer 18 is formed or constructed by braiding reinforcing yarns or filament member 22 (refer to FIG. 3) over and along an outer surface of the tubular inner rubber layer 16, more specifically along straight cylindrical shape of the both end portions 14, 14 and corrugations therebetween. Therefore, the pressure resistant reinforcement layer 18 is formed in straight cylindrical shape at both end portions 14, 14 and in shape corresponding to the corrugations or corrugated shape, for example, in shape having corrugation hills and valleys in the corrugated portion 12 between the both end portions 14, 14. The pressure resistant reinforcement layer 18 is laminated on an outer side of the inner rubber layer 16 entirely in contact or close contact relation with the outer surface thereof.

The inner rubber layer 16 in the sixth hose 110 may be formed from the same material as in the first hose 10.

In the sixth hose 110, the same material as the first hose 10 may be applied to the pressure resistant reinforcement layer 18, the reinforcing yarns 22 of the pressure resistant reinforcement layer 18 and the outer rubber layer 20. The sixth hose 110 is designed to have an inner diameter of approximately 5 to 50 mm, preferably 5 to 25 mm.

In the sixth hose 110, as shown in a fragmentary enlarged view in FIG. 27, the inner rubber layer 16 is constructed to have corrugations wherein a wall thickness $t_1$ in corrugation hills 60 of the corrugated portion 12 differs a wall thickness $t_2$ in the corrugation valleys 62.

More specifically, the inner rubber layer 16 is constructed to have corrugations wherein a wall thickness $t_1$ in corrugation hills 60 is larger than a wall thickness $t_2$ in corrugation valleys 62, and $t_1/t_2$ is fixed 1.2 to 6.0 at forming the sixth hose 110.

The sixth hose 110 as shown in FIGS. 26 and 27 may be manufactured, for example, as follows. First, the inner rubber layer 16 including corrugated portion is formed by injection molding, blow molding or the like.

And, likewise in the first hose 10, the reinforcing yarns 22 are braided on the outer surface of the inner rubber layer 16 with braiding machine 24 to form the pressure resistant reinforcement layer 18. And, the inner rubber layer 16 which is laminated with the pressure resistant reinforcement layer 18 is then dipped into a liquid compound for the outer rubber layer 20 to be coated with the outer rubber layer 20 on the outer side of the inner rubber layer 16 or the reinforcing yarns 22, and is put into a dry kiln for drying.

After dried, likewise in the first hose 10, the mandrel 23 is removed to obtain, for example, an elongate multi-layered hose product. Then, for example, the hose product is cut into desired length, and thereby the sixth hose 110 shown in FIGS. 26 and 27 is obtained. This is one example of production methods of the sixth hose 110. The sixth hose 110 may be produced in any other methods.

The sixth hose 110 may achieve the same or generally the same effects as the first hose 10.

As a general rule, in a hose having a corrugated portion, gas is more permeable, or permeates easily in the corrugation hills of large diameter than the corrugation valleys of small diameter. However, in the sixth hose 110, as the wall thickness $t_1$ in the corrugation hills 60 is designed larger than the wall thickness $t_2$ in the corrugation valleys 62 at ratio of $t_1/t_2$ in the range of 1.2 to 6.0 with respect to the corrugated portion 12 in the inner rubber layer 16, gas permeation resistance of the corrugated portion 12 is effectively improved. So, scaly filler is not required to be filled in the inner rubber layer 16 to enhance gas permeation resistance. However, scaly filler may be filled therein.

EXAMPLE 6

Some hoses are formed having different constructions as shown in Table 5, and refrigerant permeation amount, bursting pressure (pressure resistance) and flexibility are evaluated respectively. The results are shown in Table 5.

TABLE 5

| | | Example 6 | | | | |
|---|---|---|---|---|---|---|
| | | A | B | C | D | E |
| Shape | | Corrugated | Corrugated | Corrugated | Corrugated | Corrugated |
| Dimension | Inner diameter (mm) | ø9.0 (valley) | ø9.0 (valley) | ø9.0 (valley) | ø9.0 (valley) | ø9.0 (valley) |
| | Outer diameter (mm) | ø20.0 (hill) | ø20.0 (hill) | ø20.0 (hill) | ø20.0 (hill) | ø20.0 (hill) |
| | Length of corrugated portion (mm) | 100 | 100 | 100 | 100 | 100 |
| | Hose length (mm) | 150*1 | 150*1 | 150*1 | 150*1 | 150*1 |

TABLE 5-continued

| | | | | | | |
|---|---|---|---|---|---|---|
| Inner rubber layer | Material | IIR | IIR | IIR | IIR | IIR |
| | Wall thickness in corrugation hills (mm) | 1.2 | 1.5 | 3.0 | 1.5 | 3.0 |
| | Wall thickness in corrugation valleys (mm) | 1.0 | 1.0 | 1.0 | 0.5 | 0.5 |
| Reinforcement layer | Material | PET | PET | PET | PET | PET |
| | Denier (de) | 1000 | 1000 | 1000 | 1000 | 1000 |
| | No. of yarns | 3 yarns × 48 carries | 3 yarns × 48 carries | 3 yarns × 48 carries | 3 yarns × 48 carries | 3 yarns × 48 carries |
| | Construction | Braided | Braided | Braided | Braided | Braided |
| Outer rubber layer | Material | Silicon type | Silicon type | Silicon type | Silicon type | Silicon type |
| | Wall thickness (mm) | 0.5 | 0.5 | 0.5 | 0.5 | 0.5 |
| Refrigerant (HFC-134a) permeation amount at 90° C. (g/piece for 72 hours) | | 1.0 | 0.9 | 0.75 | 1.0 | 0.83 |
| Bursting pressure(MPa) | | 18.0 | 18.0 | 17.5 | 17.3 | 17.4 |
| Flexibility (N) | | 7.5 | 8.0 | 9.6 | 6.8 | 9.1 |

| | | Comparison Example | |
|---|---|---|---|
| | | K | L |
| Shape | | Corrugated | Corrugated |
| Dimension | Inner diameter (mm) | ⌀9.0 (valley) | ⌀9.0 (valley) |
| | Outer diameter (mm) | ⌀20.0 (hill) | ⌀20.0 (hill) |
| | Length of corrugated portion (mm) | 100 | 100 |
| | Hose length (mm) | 150*1 | 150*1 |
| Inner rubber layer | Material | IIR | IIR |
| | Wall thickness in corrugation hills (mm) | 1.0 | 3.5 |
| | Wall thickness in corrugation valleys (mm) | 1.0 | 0.5 |
| Reinforcement layer | Material | PET | PET |
| | Denier (de) | 1000 | 1000 |
| | No. of yarns | 3 yarns × 48 carries | 3 yarns × 48 carries |
| | Construction | Braided | Braided |
| Outer rubber layer | Material | Silicon type | Silicon type |
| | Wall thickness (mm) | 0.5 | 0.5 |
| Refrigerant (HFC-134a) permeation amount at 90° C. (g/piece for 72 hours) | | 1.2 | 0.69 |
| Bursting pressure(MPa) | | 17.9 | 16.9 |
| Flexibility (N) | | 7.4 | 10.1 |

Note:
*1Opposite ends of 25 mm are portions to be clamped respectively. Therefore, substantial hose length is 100 mm.

In Table 5, refrigerant permeation amount (gas permeation resistance), bursting pressure (pressure resistance) and flexibility are evaluated under following conditions.

[Refrigerant Permeation Amount (in Weight)]

Figure 28:
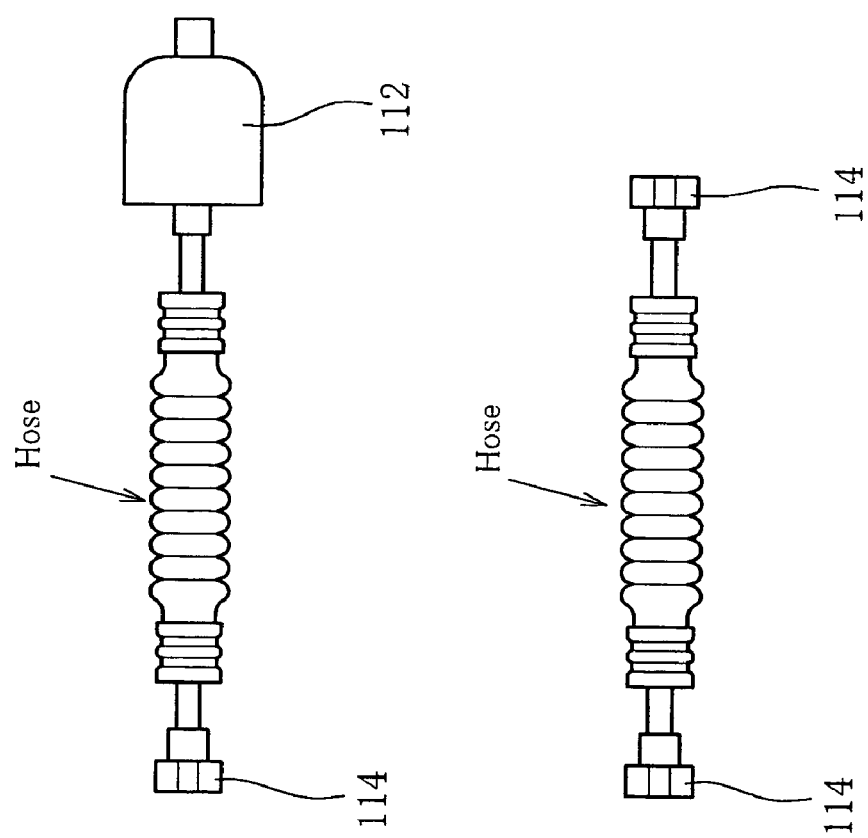
FIG. 28 is a view showing measuring method of refrigerant permeation amount of examples of the sixth vibration absorbing hose and comparative example in order to confirm effects of the sixth vibration absorbing hose.

As shown in FIG. 28, four sample hoses are prepared. Each of the three sample hoses is connected to muffler 112 with capacity of 50 cc at one end, the muffler 112 is filled with refrigerant HFC-134a to 70% of its capacity, and each of the three sample hoses is closed at the other end with caps 114. The rest one sample hose does not contain HFC-134a for checking weight change of a single hose or a hose itself, and is closed at both ends with the caps 114 as shown in FIG. 28, and in this state, weight change of the single hose is evaluated.

The sample hoses are placed in an oven at 90° C. and weight of the single hose and the sample hoses connected to the mufflers 112 is measured every 24 hours for 96 hours, and refrigerant permeation amount (in weight) per hose is calculated in the following formula:

[lost weight of the sample hose enclosed with refrigerant (96 hours–24 hours)]–lost weight of the single hose (96 hours–24 hours)]

The refrigerant permeation amount is favorably as small as possible. Here, a value of 1.1 g/hose/72 hours is targeted.

[Bursting Pressure]

Likewise in Examples 1 and 2, bursting pressure indicates water pressure value which causes a hose to burst when water pressure is exerted internally to the hose at pressurizing speed of 160 Mpa/minute.

[Flexibility]

Figure 29:
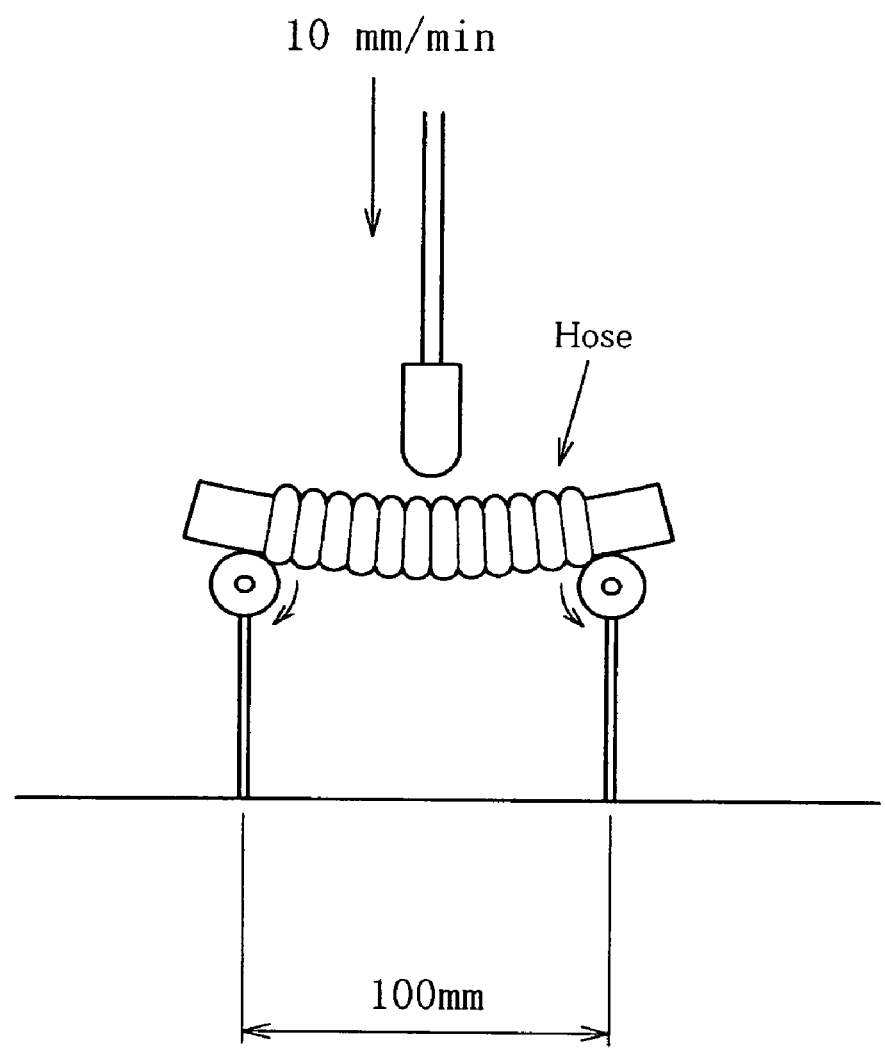
FIG. 29 is a view showing measuring method of flexibility of the examples of the sixth vibration absorbing hose and the comparative example in order to confirm effects of the sixth vibration absorbing hose.
Figure 30:
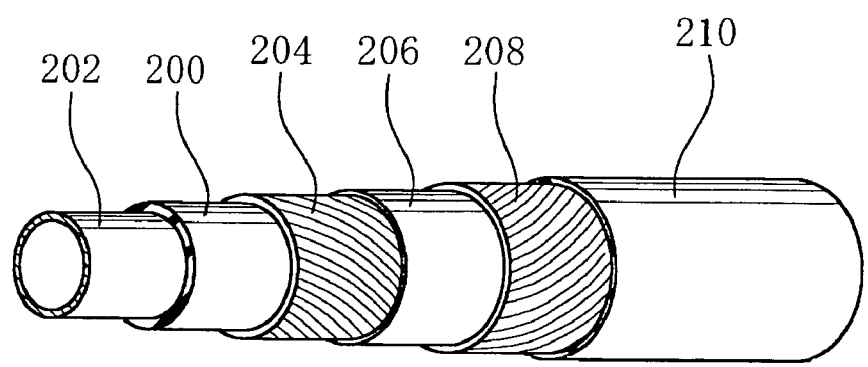
FIG. 30 is a perspective view of one of conventional vibration absorbing hoses.
Figure 31:
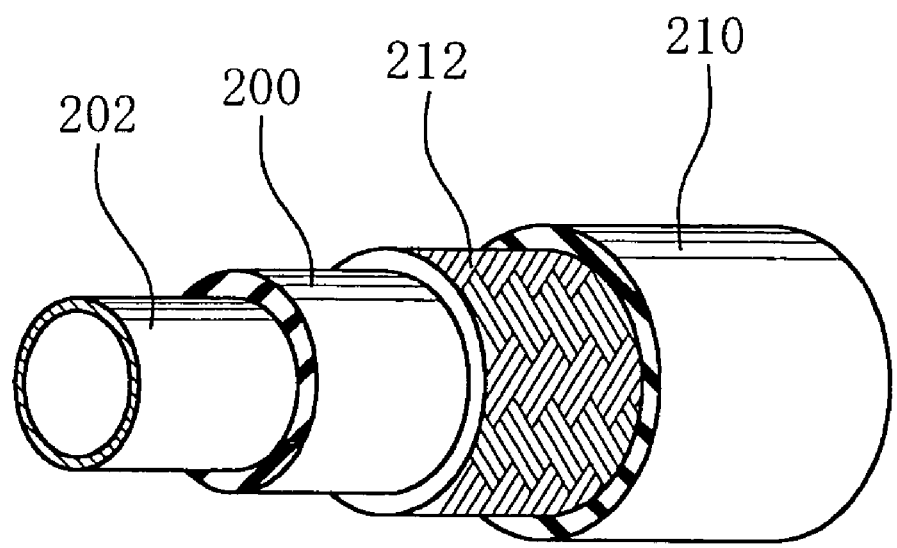
FIG. 31 is a perspective view of another conventional vibration absorbing hose having braided reinforcement layer.
Figure 32:
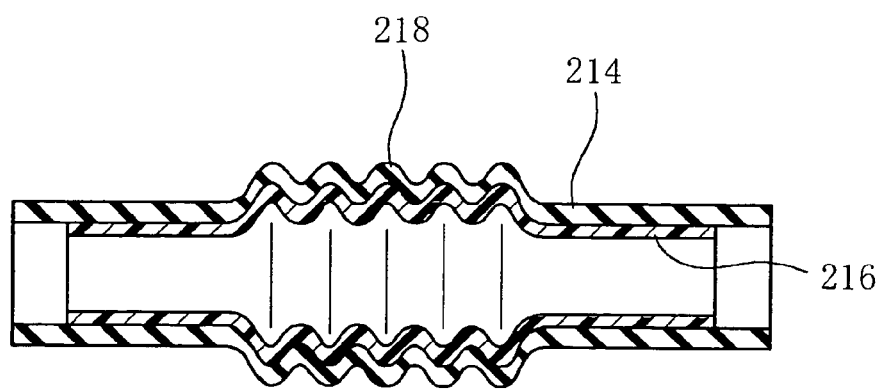
FIG. 32 is a sectional view of one vibration absorbing hose which is different from the conventional vibration absorbing hoses in FIGS. 30 and 31.

As shown in FIG. 29, each of the sample hoses is supported by two support columns spaced apart 100 mm on a base plate. Then the hose is exerted a load at rate of 10 mm/minute in a center thereof, and maximum load or load at peak is measured as indicator of flexibility. The maximum load is favorably as low as possible or flexibility is favorably as much as possible, but here value of maximum 10 newton (N) is targeted.

As indicated by the results in Table 5, the hoses A, B, C, D and E of Examples 6 (the sixth hose 110) exhibit values under the targeted values of refrigerant permeation amount and flexibility, and superior in gas permeation resistance and flexibility compared to the hoses of Comparative Example. And, the hoses A, B, C, D and E of Example 6 exhibit bursting pressure of 17 MPa or more, therefore, the excellent pressure resistance. In Table 5, descriptions in the line of "No. of yarns" are, for example, specified likewise in Table 1. And, "reinforcement layer" of Example 6 corresponds, for example, to the pressure resistant reinforcement layer 18.

In the sixth hose 110, the pressure resistant reinforcement layer 18 may be formed by winding the reinforcing yarns 22 spirally around the outer surface of the inner rubber layer 16 likewise in the first hose 10 under the circumstances.

Throughout Tables 1 to 5, different indication numerals could be assigned to Comparison Examples with identical construction.

We claim:

1. A vibration absorbing hose, comprising:
tubular rubber layer having corrugations,
pressure resistant reinforcement layer laminated on an outer surface side of the rubber layer and including reinforcing yarn or yarns provided along the corrugations, the reinforcing yarn or yarns forming the pressure resistant reinforcement layer shaped corresponding to the corrugations, and
another separate reinforcement layer laminated on an outer surface side of the pressure resistant reinforcement layer with clearance defined at positions of corrugation valleys of the corrugations between the pressure resistant reinforcement layer and the another separate reinforcement layer.

2. The vibration absorbing hose as set forth in claim 1 wherein the another separate reinforcement layer is formed by providing reinforcing yarn or yarns at a fixed angle 30° to 54.44°.

3. A vibration absorbing hose, comprising:
tubular rubber layer having corrugations,
reinforcing fabric wound spirally around an outer surface side of the rubber layer so as to constitute pressure resistant reinforcement layer in laminated relation with the rubber layer,
a plurality of rigid annular arresting rings individually arranged along a longitudinal direction of the vibration absorbing hose, the arresting rings being fitted on an outer side of the reinforcing fabric at positions of corrugation valleys of the corrugations so as to arrest the reinforcing fabric radially in order to form the pressure resistant reinforcement layer shaped corresponding to the corrugations, and
the reinforcing fabric being formed by braiding or interlacing reinforcing warp yarns and reinforcing weft yarns, and being wound around the outer surface side of the rubber layer so that the reinforcing warp yarns and the reinforcing weft yarns are oriented at inclined angle with respect to a longitudinal direction of the vibration absorbing hose respectively.

4. A vibration absorbing hose, comprising:
tubular rubber layer having corrugations,
pressure resistant reinforcement layer laminated on an outer surface side of the rubber layer and including reinforcement yarn or yarns provided along the corrugations, the reinforcing yarn or yarns forming the pressure resistant reinforcement layer shaped corresponding to the corrugations, and
a resin membrane laminated in an inner surface of the rubber layer, or on an outer surface of the rubber layer and in an inner side of the pressure resistant reinforcement layer, the resin membrane having a thickness of 50 $\mu$m to 250 $\mu$m.

5. A vibration absorbing hose, comprising:
tubular rubber layer having corrugations,
pressure resistant reinforcement layer laminated on an outer surface side of the rubber layer and including reinforcing yarn or yarns provided along the corrugations, the reinforcing yarn or yarns forming the pressure resistant reinforcement layer shaped corresponding to the corrugations, and
the rubber layer has a larger wall thickness in corrugation hills of the corrugations than in corrugation valleys thereof.

6. The vibration absorbing hose as set forth in claim 5 wherein the wall thickness of the rubber layer in corrugation hills of the corrugations is designed 1.2 to 6.0 times as large as that in corrugation valleys thereof.

7. The vibration absorbing hose as set forth in claim 1 wherein the pressure resistant reinforcement layer includes longitudinally oriented reinforcement yarn or yarns running in a longitudinal direction of the vibration absorbing hose.

8. The vibration absorbing hose as set forth in claim 3 wherein the pressure resistant reinforcement layer includes longitudinally oriented reinforcement yarn or yarns running in a longitudinal direction of the vibration absorbing hose.

9. The vibration absorbing hose as set forth in claim 4 wherein the pressure resistant reinforcement layer includes longitudinally oriented reinforcement yarn or yarns running in a longitudinal direction of the vibration absorbing hose.

10. The vibration absorbing hose as set forth in claim 5 wherein the pressure resistant reinforcement layer includes longitudinally oriented reinforcement yarn or yarns running in a longitudinal direction of the vibration absorbing hose.

11. The vibration absorbing hose as set forth in claim 1, further comprising:
a plurality of rigid annular arresting rings individually arranged along a longitudinal direction of the vibration absorbing hose, the arresting rings being fitted on an outer side of the pressure resistant reinforcement layer at positions of corrugation valleys of the corrugations so as to arrest the pressure resistant reinforcement layer radially respectively.

12. The vibration absorbing hose as set forth in claim 4, further comprising:
a plurality of rigid annular arresting rings individually arranged along a longitudinal direction of the vibration absorbing hose, the arresting rings being fitted on an outer side of the pressure resistant reinforcement layer at positions of corrugation valleys of the corrugations so as to arrest the pressure resistant reinforcement layer radially respectively.

13. The vibration absorbing hose as set forth in claim 5, further comprising:

a plurality of rigid annular arresting rings individually arranged along a longitudinal direction of the vibration absorbing hose, the arresting rings being fitted on an outer side of the pressure resistant reinforcement layer at positions of corrugation valleys of the corrugations so as to arrest the pressure resistant reinforcement layer radially respectively.

* * * * *